US012567408B2

(12) United States Patent
Hines et al.

(10) Patent No.: US 12,567,408 B2
(45) Date of Patent: Mar. 3, 2026

(54) MULTI-MODAL SMART AUDIO DEVICE SYSTEM ATTENTIVENESS EXPRESSION

(71) Applicant: Dolby Laboratories Licensing Corporation, San Francisco, CA (US)

(72) Inventors: Christopher Graham Hines, Sydney (AU); Rowan James Katekar, Redfern (AU); Glenn N. Dickins, Como (AU); Richard J. Cartwright, Sydney (AU); Jeremiha Emile Douglas, Mill Valley, CA (US); Mark R.P. Thomas, Walnut Creek, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 447 days.

(21) Appl. No.: 17/626,617

(22) PCT Filed: Jul. 30, 2020

(86) PCT No.: PCT/US2020/044346
§ 371 (c)(1),
(2) Date: Jan. 12, 2022

(87) PCT Pub. No.: WO2021/022089
PCT Pub. Date: Feb. 4, 2021

(65) Prior Publication Data
US 2022/0270601 A1    Aug. 25, 2022

Related U.S. Application Data

(60) Provisional application No. 62/880,110, filed on Jul. 30, 2019, provisional application No. 62/880,112,
(Continued)

(51) Int. Cl.
| | |
|---|---|
| *G10L 15/22* | (2006.01) |
| *G10L 15/08* | (2006.01) |
| *G10L 15/32* | (2013.01) |

(52) U.S. Cl.
CPC .............. *G10L 15/22* (2013.01); *G10L 15/32* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | |
|---|---|---|
| 7,297,929 B2 | 11/2007 | Cernasov |
| 7,843,353 B2 | 11/2010 | Pan |
| (Continued) | | |

FOREIGN PATENT DOCUMENTS

| | | |
|---|---|---|
| WO | 2014130463 A2 | 8/2014 |
| WO | 2019059939 A1 | 3/2019 |
| WO | 2021021814 | 2/2021 |

OTHER PUBLICATIONS

Wolfram Mathworld, Correlation Coefficient http://mathworld.wolfram.com/CorrelationCoefficient.html.
(Continued)

*Primary Examiner* — Nicole A K Schmieder

(57) ABSTRACT

A method may involve receiving output signals from each microphone of a plurality of microphones in the environment, each of the plurality of microphones residing in a microphone location of the environment, the output signals corresponding to an utterance of a person. The method may involve determining, based at least in part on the output signals, a zone within the environment that has at least a threshold probability of including the person's location and generating a plurality of spatially-varying attentiveness signals within the zone. Each attentiveness signal may be generated by a device located within the zone. Each attentiveness signal may indicate that a corresponding device is in an operating mode in which the corresponding device is
(Continued)

awaiting a command and may indicate a relevance metric of the corresponding device.

16 Claims, 8 Drawing Sheets

Related U.S. Application Data filed on Jul. 30, 2019, provisional application No. 62/964,018, filed on Jan. 21, 2020, provisional application No. 63/003,788, filed on Apr. 1, 2020.

(56) References Cited

U.S. PATENT DOCUMENTS

| | | | | |
|---|---|---|---|---|
| 8,279,079 | B2 | 10/2012 | Bergman | |
| 8,930,841 | B2 | 1/2015 | Huang | |
| 9,076,450 | B1 | 7/2015 | Sadek et al. | |
| 9,270,139 | B2 | 2/2016 | Rofougaran | |
| 9,275,637 | B1 | 3/2016 | Salvador | |
| 9,318,107 | B1 | 4/2016 | Sharifi | |
| 9,368,105 | B1 | 6/2016 | Freed | |
| 9,674,781 | B2 | 6/2017 | Szewczyk | |
| 9,691,378 | B1 | 6/2017 | Meyers | |
| 9,721,586 | B1 | 8/2017 | Bay | |
| 9,723,689 | B2 | 8/2017 | Łagutko | |
| 9,734,830 | B2 | 8/2017 | Lindahl | |
| 9,774,507 | B2 | 9/2017 | Britt | |
| 9,826,601 | B2 | 11/2017 | Vangeel | |
| 9,927,249 | B2 | 3/2018 | Barnard | |
| 9,996,316 | B2 | 6/2018 | Jorgovanovic | |
| 9,997,070 | B1 | 6/2018 | Komanduri | |
| 10,013,981 | B2 | 7/2018 | Ramprashad | |
| 10,026,399 | B2 | 7/2018 | Gopalan | |
| 10,043,521 | B2 | 8/2018 | Bocklet | |
| 10,134,399 | B2 | 11/2018 | Lang | |
| 10,140,849 | B2 | 11/2018 | Sloo | |
| 10,181,323 | B2 | 1/2019 | Beckhardt | |
| 10,192,546 | B1 | 1/2019 | Piersol | |
| 10,304,450 | B2 * | 5/2019 | Tak | H04N 21/47 |
| 10,380,852 | B2 * | 8/2019 | Horling | G08B 13/1672 |
| 10,425,781 | B1 * | 9/2019 | Devaraj | H04W 8/186 |
| 2004/0141418 | A1 | 7/2004 | Matsuo | |
| 2005/0018861 | A1 | 1/2005 | Tashev | |
| 2014/0163978 | A1 | 6/2014 | Basye | |
| 2016/0259419 | A1 | 9/2016 | Chatterjee | |
| 2017/0083285 | A1 | 3/2017 | Meyers | |
| 2017/0090864 | A1 | 3/2017 | Jorgovanovic | |
| 2017/0330429 | A1 | 11/2017 | Tak | |
| 2018/0047394 | A1 | 2/2018 | Tian | |
| 2018/0108351 | A1 | 4/2018 | Beckhardt et al. | |
| 2018/0211665 | A1 | 7/2018 | Park | |
| 2018/0228006 | A1 | 8/2018 | Baker | |
| 2018/0330589 | A1 | 11/2018 | Horling | |
| 2018/0335903 | A1 | 11/2018 | Coffman | |
| 2018/0342151 | A1 | 11/2018 | Vanblon | |
| 2019/0066670 | A1 | 2/2019 | White et al. | |
| 2019/0096398 | A1 | 3/2019 | Sereshki | |
| 2019/0130914 | A1 | 5/2019 | Sharifi | |
| 2019/0179611 | A1 | 6/2019 | Wojogbe | |

OTHER PUBLICATIONS

Wikipedia: Dynamic Time Warping ; https://en.wikipedia.org/wiki/Dynamic_time_warping.

* cited by examiner

100

108
107

109
110

106
105

102

101

104
103

300

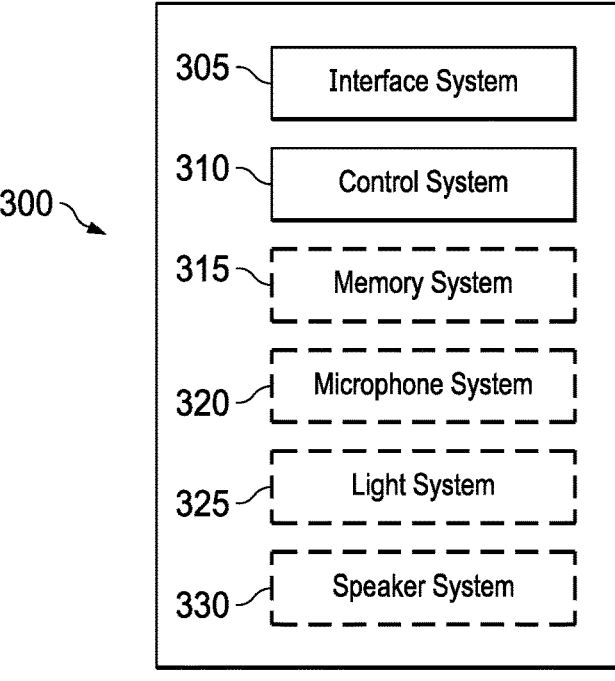

305 — Interface System

310 — Control System

315 — Memory System

320 — Microphone System

325 — Light System

330 — Speaker System

Figure 3

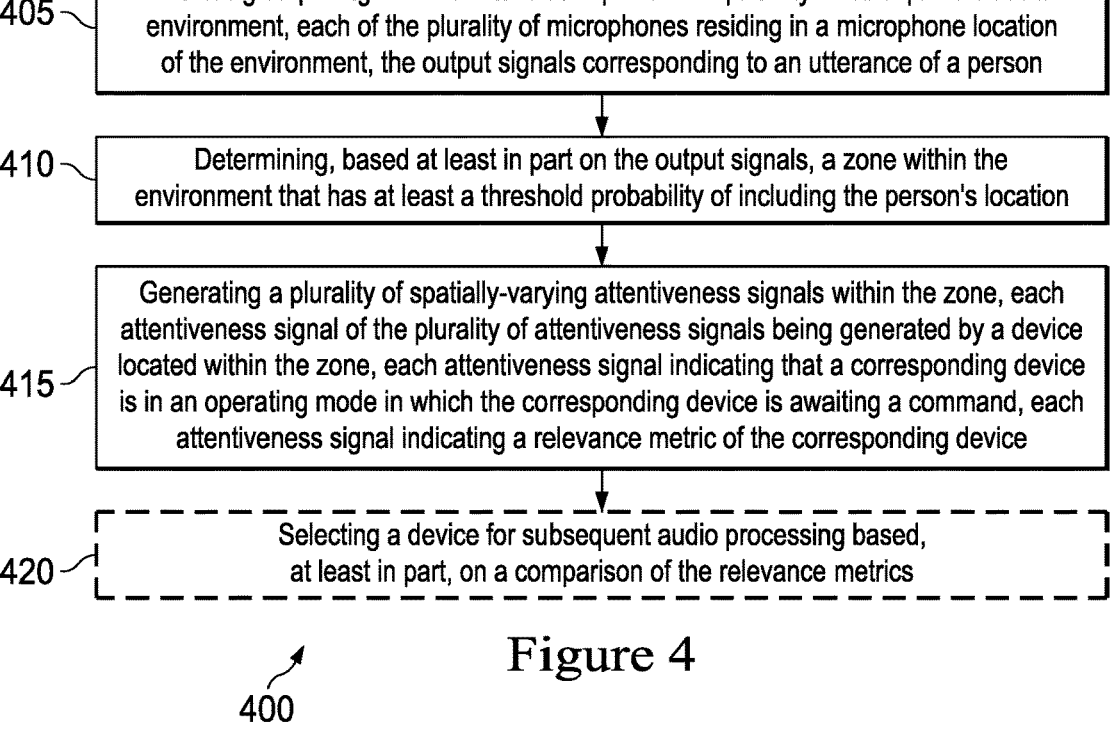

405 — Receiving output signals from each microphone of a plurality of microphones in the environment, each of the plurality of microphones residing in a microphone location of the environment, the output signals corresponding to an utterance of a person 410 — Determining, based at least in part on the output signals, a zone within the environment that has at least a threshold probability of including the person's location 415 — Generating a plurality of spatially-varying attentiveness signals within the zone, each attentiveness signal of the plurality of attentiveness signals being generated by a device located within the zone, each attentiveness signal indicating that a corresponding device is in an operating mode in which the corresponding device is awaiting a command, each attentiveness signal indicating a relevance metric of the corresponding device 420 — Selecting a device for subsequent audio processing based, at least in part, on a comparison of the relevance metrics

MULTI-MODAL SMART AUDIO DEVICE SYSTEM ATTENTIVENESS EXPRESSION

CROSS-REFERENCE TO RELATED APPLICATIONS

This application claims priority to U. S. Provisional Patent Application No. 62/880,110 filed 30 Jul. 2019; U.S. Provisional Patent Application No. 62/880,112 filed 30 Jul. 2019; U.S. Provisional Patent Application No. 62/964,018 filed 21 Jan. 2020; and U.S. Provisional Patent Application No. 63/003,788 filed 1 Apr. 2020, which are incorporated herein by reference.

TECHNICAL FIELD

This disclosure pertains to systems and methods for automatically controlling a plurality of smart audio devices in an environment.

BACKGROUND

Audio devices, including but not limited to smart audio devices, have been widely deployed and are becoming common features of many homes. Although existing systems and methods for controlling audio devices provide benefits, improved systems and methods would be desirable.

Notation and Nomenclature

Herein, we use the expression "smart audio device" to denote a smart device which is either a single purpose audio device or a virtual assistant (e.g., a connected virtual assistant). A single purpose audio device is a device (e.g., a smart speaker, a television (TV) or a mobile phone) including or coupled to at least one microphone (and which may in some examples also include or be coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user-configured area.

Herein, a "virtual assistant" (e.g., a connected virtual assistant) is a device (e.g., a smart speaker, a smart display or a voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. Connected devices may form a sort of constellation, which may be managed by one main application which may be (or include or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed. The speaker feed may, in some instances, undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods, such as methods of controlling a system of devices in an environment. In some instances, the methods may be implemented, at least in part, by a control system such as those disclosed herein. Some such methods may involve receiving output signals from each microphone of a plurality of microphones in the environment. Each of the plurality of microphones may reside in a microphone location of the environment. The output signals may, in some examples, correspond to an utterance of a person. According to some examples, at least one of the microphones may be included in or configured for communication with a smart audio device. In some instances, a first microphone of the plurality of microphones may sample audio data according to a first sample clock and a second microphone of the plurality of microphones may sample audio data according to a second sample clock.

Some such methods may involve determining, based at least in part on the output signals, a zone within the environment that has at least a threshold probability of including the person's location. Some such methods may involve generating a plurality of spatially-varying attentiveness signals within the zone. In some instances, each attentiveness signal of the plurality of attentiveness signals may be generated by a device located within the zone. Each attentiveness signal may, for example, indicate that a corresponding device is in an operating mode in which the corresponding device is awaiting a command. In some examples, each attentiveness signal may indicate a relevance metric of the corresponding device.

In some implementations, an attentiveness signal generated by a first device may indicate a relevance metric of a second device. The second device may, in some examples, be a device corresponding to the first device. In some instances, the utterance may be, or may include, a wakeword. According to some such examples, the attentiveness signals vary, at least in part, according to estimations of wakeword confidence.

According to some examples, at least one of the attentiveness signals may be a modulation of at least one previous signal generated by a device within the zone prior to a time of the utterance. In some instances, the at least one previous signal may be, or may include, a light signal. According to some such examples, the modulation may be a color modulation, a color saturation modulation and/or a light intensity modulation.

In some instances, the at least one previous signal may be, or may include, a sound signal. According to some such examples, the modulation may be a level modulation. Alternatively, or additionally the modulation may be a change in one or more of a fan speed, a flame size, a motor speed or an air flow rate.

According to some examples, the modulation may be what is referred to herein as a "swell." A swell may be, or may include, a predetermined sequence of signal modulations. In some examples, the swell may include a first time interval corresponding to a signal level increase from a baseline level. According to some such examples, the swell may include a second time interval corresponding to a signal level decrease to the baseline level. In some instances, the swell may include a hold time interval after the first time interval and before the second time interval. The hold time interval may, in some instances, correspond to a constant signal level. In some examples, the swell may include a first time interval corresponding to a signal level decrease from a baseline level.

According to some examples, the relevance metric may be based, at least in part, on an estimated distance from a location. In some instances, the location may be an estimated location of the person. In some examples, the estimated distance may be an estimated distance from the location to an acoustic centroid of a plurality of microphones within the zone. According to some implementations, the relevance metric may be based, at least in part, on an estimated visibility of the corresponding device.

Some such methods may involve an automated process of determining whether a device is in a device group. According to some such examples, the automated process may be based, at least in part, on sensor data corresponding to light and/or sound emitted by the device. In some instances, the automated process may be based, at least in part, on communications between a source and a receiver. The source may, for example, be a light source and/or a sound source. According to some examples, the automated process may be based, at least in part, on communications between a source and an orchestrating hub device and/or a receiver and the orchestrating hub device. In some instances, the automated process may be based, at least in part, on a light source and/or a sound source being switched on and off for a duration of time.

Some such methods may involve automatically updating the automated process according to explicit feedback from the person. Alternatively, or additionally, some methods may involve automatically updating the automated process according to implicit feedback. The implicit feedback may, for example, be based on a success of beamforming based on an estimated zone, a success of microphone selection based on the estimated zone, a determination that the person has terminated the response of a voice assistant abnormally, a command recognizer returning a low-confidence result and/or a second-pass retrospective wakeword detector returning low confidence that a wakeword was spoken.

Some methods may involve selecting at least one speaker of a device located within the zone and controlling the at least one speaker to provide sound to the person. Alternatively, or additionally, some methods may involve selecting at least one microphone of a device located within the zone. Some such methods may involve providing signals output by the at least one microphone to a smart audio device.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves controlling a system of devices in an environment. Some such methods may involve receiving output signals from each microphone of a plurality of microphones in the environment. Each of the plurality of microphones may reside in a microphone location of the environment. The output signals may, in some examples, correspond to an utterance of a person. According to some examples, at least one of the microphones may be included in or configured for communication with a smart audio device. In some instances, a first microphone of the plurality of microphones may sample audio data according to a first sample clock and a second microphone of the plurality of microphones may sample audio data according to a second sample clock.

Some such methods may involve determining, based at least in part on the output signals, a zone within the environment that has at least a threshold probability of including the person's location. Some such methods may involve generating a plurality of spatially-varying attentiveness signals within the zone. In some instances, each attentiveness signal of the plurality of attentiveness signals may be generated by a device located within the zone. Each attentiveness signal may, for example, indicate that a corresponding device is in an operating mode in which the corresponding device is awaiting a command. In some examples, each attentiveness signal may indicate a relevance metric of the corresponding device.

In some implementations, an attentiveness signal generated by a first device may indicate a relevance metric of a second device. The second device may, in some examples, be a device corresponding to the first device. In some instances, the utterance may be, or may include, a wakeword. According to some such examples, the attentiveness signals vary, at least in part, according to estimations of wakeword confidence.

According to some examples, at least one of the attentiveness signals may be a modulation of at least one previous signal generated by a device within the zone prior to a time of the utterance. In some instances, the at least one previous signal may be, or may include, a light signal. According to some such examples, the modulation may be a color modulation, a color saturation modulation and/or a light intensity modulation.

In some instances, the at least one previous signal may be, or may include, a sound signal. According to some such examples, the modulation may be a level modulation. Alternatively, or additionally the modulation may be a change in one or more of a fan speed, a flame size, a motor speed or an air flow rate.

According to some examples, the modulation may be what is referred to herein as a "swell." A swell may be, or may include, a predetermined sequence of signal modulations. In some examples, the swell may include a first time interval corresponding to a signal level increase from a baseline level. According to some such examples, the swell may include a second time interval corresponding to a signal level decrease to the baseline level. In some instances, the swell may include a hold time interval after the first time interval and before the second time interval. The hold time interval may, in some instances, correspond to a constant signal level. In some examples, the swell may include a first time interval corresponding to a signal level decrease from a baseline level.

According to some examples, the relevance metric may be based, at least in part, on an estimated distance from a location. In some instances, the location may be an estimated location of the person. In some examples, the estimated distance may be an estimated distance from the location to an acoustic centroid of a plurality of microphones within the zone. According to some implementations, the relevance metric may be based, at least in part, on an estimated visibility of the corresponding device.

Some such methods may involve an automated process of determining whether a device is in a device group. According to some such examples, the automated process may be based, at least in part, on sensor data corresponding to light and/or sound emitted by the device. In some instances, the automated process may be based, at least in part, on communications between a source and a receiver. The source may, for example, be a light source and/or a sound source. According to some examples, the automated process may be based, at least in part, on communications between a source and an orchestrating hub device and/or a receiver and the orchestrating hub device. In some instances, the automated process may be based, at least in part, on a light source and/or a sound source being switched on and off for a duration of time.

Some such methods may involve automatically updating the automated process according to explicit feedback from the person. Alternatively, or additionally, some methods may involve automatically updating the automated process according to implicit feedback. The implicit feedback may, for example, be based on a success of beamforming based on an estimated zone, a success of microphone selection based on the estimated zone, a determination that the person has terminated the response of a voice assistant abnormally, a command recognizer returning a low-confidence result and/or a second-pass retrospective wakeword detector returning low confidence that a wakeword was spoken.

Some methods may involve selecting at least one speaker of a device located within the zone and controlling the at least one speaker to provide sound to the person. Alternatively, or additionally, some methods may involve selecting at least one microphone of a device located within the zone. Some such methods may involve providing signals output by the at least one microphone to a smart audio device.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 is a block diagram that shows examples of components of an apparatus capable of implementing various aspects of this disclosure.
FIG. 4 is a flow diagram that outlines one example of a method that may be performed by at least one apparatus such as that shown in FIG. 3.

Like reference numbers and designations in the various drawings indicate like elements.

DETAILED DESCRIPTION

Figure 1A:
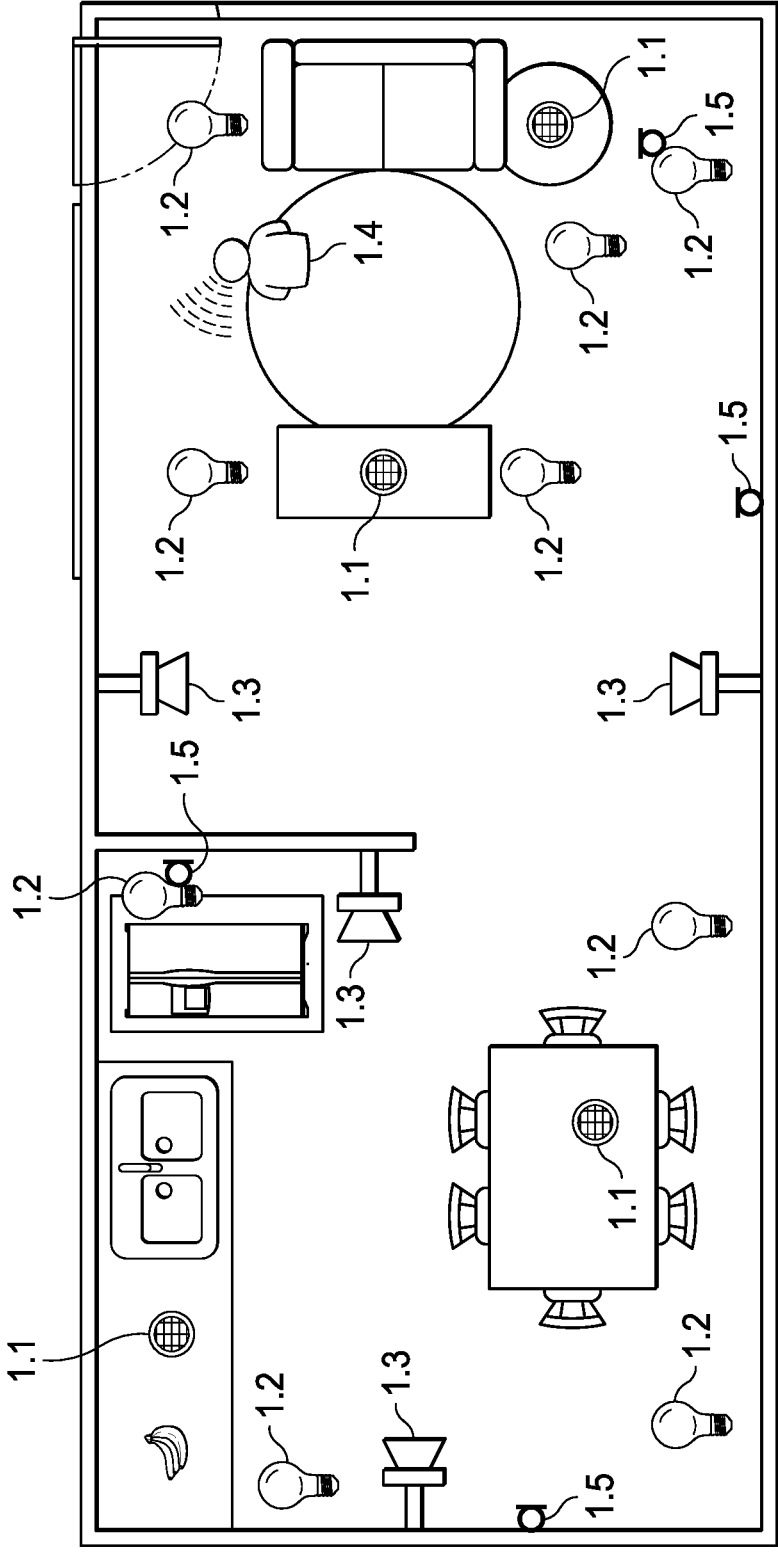
FIG. 1A represents an environment according to one example.

Some embodiments involve a system of orchestrated smart audio devices, in which each of the devices may be configured to indicate (to a user) when it has heard a "wakeword" and is listening for a sound command (i.e., a command indicated by sound) from the user.

A class of embodiments involves the use of voice based interfaces in various environments (e.g., relatively large living environments) where there is no single point of attention for the user interaction or user interface. As technology progresses towards extensive Internet of Things (IOT) automation and connected devices, there are many things around and on us that represent the ability to take sensory input and to deliver information through the change or transduction of signals into the environment. In the case of automation for our living or work spaces, intelligence (e.g., provided at least in part by automated assistant(s)) may be embodied in a very pervasive or ubiquitous sense in the environment in which we are living or working. There may be a sense that an assistant is a bit omnipresent and also non-intrusive, which may in itself create a certain paradoxical aspect of the user interface.

Home automation and assistants in our personal and living spaces may no longer reside in, control or embody a single device. There may be a design goal that collectively many devices try to present a pervasive service or presence. However, to be natural, we need to engage and trigger a normal sense of interaction and acknowledgement through interaction with such personal assistants.

It is natural that we engage such interfaces primarily with voice. In accordance with some embodiments it is envisaged that there is use of voice for both initiating an interaction (e.g., with at least one smart audio device), and also for engaging with at least one smart audio device (e.g., an assistant). In some applications, speech may be the most frictionless and high bandwidth approach to specifying more detail in a request, and/or providing ongoing interaction and acknowledgement.

However, the process of human communication, while anchored on language, is actually built on the first stages of signaling for and acknowledging attention. We typically do not issue commands or voice information without first having some sense that the recipient is available, ready and interested. The ways we can command attention are numerous, though at present in current system design and user interface, the way a system shows a response of attentiveness is more mirrored in the computing single interface text space than it is in interaction efficiency and naturalness. With most systems involving simple visual indicators (lights) primarily at the point of the device being the nearest microphone or user console, this is not well suited to foreseeable future living environments with more pervasive system integration and ambient computing.

Signaling and attention expression are key parts of the transaction where a user indicates a desire to interact with at least one smart audio device (e.g., virtual assistant), and each device shows awareness of the user and initial and ongoing attention towards comprehension and support. In conventional designs there are several jarring aspects of interactions where an assistant is seen as more of a discrete device interface. These aspects include:

where there are multiple points or devices potentially ready to accept input and give attention, it is not simply the closest device to the user that is most appropriate to express attention;

given the broad range of ergonomics of living and flexible working spaces, the visual attention of a user may not be aligned with any lighting response to indicate acknowledgement;

while voice may come from a discrete place, it is really often the house or habitat we are addressing and seeking support from, and giving a more pervasive sense of attention is superior to a single device that must change discretely or abruptly between interactions;

in conditions of high noise and echo, it may be possible to make mistakes in locating the user to express attentiveness to a particular zone, location or device;

in many cases a user may be moving to or from a particular area and therefore decisions on the boundary would be jarring if made to be a forced choice to a location or device;

generally, forms of attention expression have very discrete time boundaries, in terms of something clearly happening or not.

Accordingly, we envision that interaction between a user and one or more smart audio devices will typically start with a call (originated by the user) to attention (e.g., a wakeword uttered by the user), and continue with at least one indication (or signal or expression) of "attentiveness" from the smart audio device(s), or from devices associated with the smart audio devices. We also envision that in some embodiments, at least one smart audio device (e.g., a suggestive assistant) may be constantly listening for sound signals (e.g., of a type indicating activity by a user), or may be continuously sensitive to other activity (not necessarily sound signals), and that the smart audio device will enter a state or operating mode in which it awaits a command (e.g., a voice command) from a user upon detecting sound (or activity) of a predetermined type. Upon entering this latter state or operating mode, each such device expresses attentiveness (e.g., in any of the ways described herein).

It is known to configure a smart audio device in a discrete physical zone to detect a user (who has uttered a wakeword that has been detected by the device), and to respond to the wakeword by transmitting a visual signal and/or an auditory signal which can be seen or heard by a user in the zone. Some disclosed embodiments implement a departure from this known approach by configuring one or more smart audio devices (of a system) to consider a user's position as uncertain (within some volume, or area, of uncertainty), and by using all available smart audio devices within the volume (or area) of uncertainty to provide a spatially-varying expression of "attentiveness" of the system through one or more (e.g., all) states or operating modes of the devices. In some embodiments, the goal is not to pick the single closest device to the user and override its current setting, but to modulate behavior of all the devices according to a relevance metric, which may in some examples be based at least in part on a device's estimated proximity to the user. This gives the sense of a system which is focusing its attention on a localized area, eliminating the jarring experience of a distant device indicating that the system is listening when the user is attempting to get the attention of a closer one of the devices.

Some embodiments provide (or are configured to provide) a coordinated utilization of all the smart audio devices in an environment or in a zone of the environment, by defining and implementing the ability of each device to generate an attentiveness signal (e.g., in response to a wakeword). In some implementations, some or all of the devices may be configured to "mix in" the attentiveness signal into a current configuration (and/or to generate the attentiveness signal to be at least partially determined by the current configurations of all the devices). In some implementations, each device may be configured to determine a probabilistic estimate of a distance from a location, such as the device's distance from the user's position. Some such implementations may provide a cohesive, orchestrated expression of the system's behavior in a way that is perceptually relevant to the user.

For a smart audio device which includes (or is coupled to) at least one speaker, the attentiveness signal may be sound emitted from at least one such speaker. Alternatively, or additionally, the attentiveness signal may be of some other type (e.g., light). In some example, the attentiveness signal may be or include two or more components (e.g., emitted sound and light).

Herein, we sometimes use the phrase "attentiveness indication" or "attentiveness expression" interchangeably with the phrase "attentiveness signal."

In a class of embodiments, a plurality of smart audio devices may be coordinated (orchestrated), and each of the devices may be configured to generate an attentiveness signal in response to a wakeword. In some implementations, a first device may provide an attentiveness signal corresponding to a second device. In some examples, the attentiveness signals corresponding to all the devices are coordinated. Aspects of some embodiments pertain to implementing smart audio devices, and/or to coordinating smart audio devices.

In accordance with some embodiments, in a system, multiple smart audio devices may respond (e.g., by emitting light signals) in coordinated fashion (e.g., to indicate a degree of attentiveness or availability) to determination by the system of a common operating point (or operating state). For example, the operating point may be a state of attentiveness, entered in response to a wakeword from a user, with all the devices having an estimate (e.g., with at least one degree of uncertainty) of the user's position, and in which the devices emit light of different colors depending on their estimated distances from the user.

Following on from the study of users and experiments with interactions, the inventors have recognized some particular rules or guidelines which may apply to wide area life assistants expressing attention and which underpin some disclosed embodiments. These include the following:

attention may show a continuous and responsive escalation or a person signaling. This gives a better indication and closed loop on training the required signaling effort, and creates a more natural interaction. It may be useful to note the range of intensity of signaling (e.g., from a whispered gentle request to a shouted expletive) and to determine associated impedance matched responses (e.g., from a response corresponding to a gentle raised glance through to a response corresponding to standing to attention);

signaling attention may similarly continuously propagate uncertainty and ambiguity about the location and focal point of the user. The wrong item or object responding creates a very disconnected and disembodied sense of interaction and attention. Therefore, forced choices should be avoided;

more (rather than less) pervasive signaling and transducers are often preferred to complement any single point of voice response, with continuous control often an important component; and it may be advantageous for the expression of attention to be able to naturally swell and return to a baseline setting or environment, giving the sense of companionship and presence rather than a purely transactional and information based interface.

It is well known that some things quickly anthropomorphize, and subtle aspects of timing and continuity have a large impact. Some disclosed embodiments implement continuous control of output devices in an environment to register some sensory effect on a user, and control the devices in a way to naturally swell and return to express attention and release, while avoiding jarring hard decisions around location and binary decisions of interaction threshold.

FIG. 1A is a diagram of an environment (a living space) which includes a system including a set of smart audio devices (devices 1.1) for audio interaction, speakers (1.3) for audio output, microphones 1.5 and controllable lights (1.2). As with the other figures of this application, the particular elements and the arrangement of the elements that are shown in FIG. 1A are merely made by way of example. Not all of these features may be needed to perform various disclosed implementations. For example, the controllable lights 1.2, speakers 1.3, etc. are optional for at least some disclosed implementations. In some instances one or more of the microphones 1.5 may be part of, or associated with one of the devices 1.1, the lights 1.2 or the speakers 1.3. Alternatively, or additionally, one or more of the microphones 1.5 may be attached to another part of the environment, e.g., to a wall, to a ceiling, to furniture, to an appliance or to another device of the environment. In an example, each of the smart audio devices 1.1 includes (and/or is configured for communication with) at least one microphone 1.5. The system of FIG. 1A may be configured to implement an embodiment of the present disclosure. Using various methods, information may be obtained collectively from the microphones 1.5 of FIG. 1A and provided to a device configured to provide a positional estimate of a user 1.4 who speaks a wakeword.

In a living space (e.g., that of FIG. 1A), there are a set of natural activity zones where a person would be performing a task or activity, or crossing a threshold. These areas, which may be referred to herein as user zones, may be defined by a user, in some examples, without specifying coordinates or other indicia of a geometric location. In the example shown in FIG. 1A, user zones may include:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

In accordance with some embodiments, a system that estimates where a sound (e.g., a wakeword or other signal for attention) arises or originates may have some determined confidence in (or multiple hypotheses for) the estimate. For example, if a user happens to be near a boundary between zones of the system's environment, an uncertain estimate of location of the user may include a determined confidence that the user is in each of the zones. In some conventional implementations of voice interface it is required that the voice assistant's voice is only issued from one location at a time, this forcing a single choice for the single location (e.g., one of the eight speaker locations, 1.1 and 1.3, in FIG. 1A). However, based on simple imaginary role play, it is apparent that (in such conventional implementations) the likelihood of the selected location of the source of the assistant's voice (e.g., the location of a speaker included in or configured for communication with the assistant) being the focus point or natural return response for expressing attention may be low.

Figure 1B:
FIG. 1B represents an environment according to another example.

Next, with reference to FIG. 1B, we describe another environment 100 (an acoustic space) which includes a user (101) who utters direct speech 102, and an example of a system including a set of smart audio devices (103, 105 and 107), speakers for audio output, and microphones. The system may be configured in accordance with an embodiment of the present disclosure. The speech uttered by user 101 (sometimes referred to herein as a talker) may be recognized by element(s) of the system as a wakeword.

More specifically, elements of the FIG. 1B system include:

102: direct local voice (produced by the user 101);

103: voice assistant device (coupled to one or more loudspeakers). Device 103 is positioned nearer to the user 101 than is device 105 or device 107, and thus device 103 is sometimes referred to as a "near" device, device 105 may be referred to as a "mid-distance" device and device 107 may be referred to as a "distant" device;

104: plurality of microphones in (or coupled to) the near device 103;

105: mid-distance voice assistant device (coupled to one or more loudspeakers);

106: plurality of microphones in (or coupled to) the mid-distance device 105;

107: distant voice assistant device (coupled to one or more loudspeakers);

108: plurality of microphones in (or coupled to) the distant device 107;

109: Household appliance (e.g. a lamp); and

110: Plurality of microphones in (or coupled to) household appliance 109. In some examples, each of the microphones 110 may be configured for communication with a device configured for implementing one or more of the disclosed methods, which may in some instances be at least one of devices 103, 105 or 107.

The system of FIG. 1B may include at least one device that is configured for implementing one or more methods that are disclosed herein. For example, device 103, device 105 and/or device 107 may be configured for implementing one or more such methods. Alternatively, or additionally, another device that is configured for communication with device 103, device 105 and/or device 107 may be configured for implementing one or more such methods. In some examples, one or more disclosed methods may be implemented by another local device (e.g., a device within the environment 100), whereas in other examples one or more disclosed methods may be implemented by a remote device that is located outside of the environment 100 (e.g., a server).

As talker 101 utters sound 102 indicative of a wakeword in the acoustic space, the sound is received by nearby device 103, mid-distance device 105, and far device 107. In this example, each of devices 103, 105, and 107 is (or includes) a wakeword detector, and each of devices 103, 105, and 107 is configured to determine when wakeword likelihood (probability that a wakeword has been detected by the device) exceeds a predefined threshold. As time progresses, the wakeword likelihood determined by each device can be graphed as a function of time.

Figure 2:
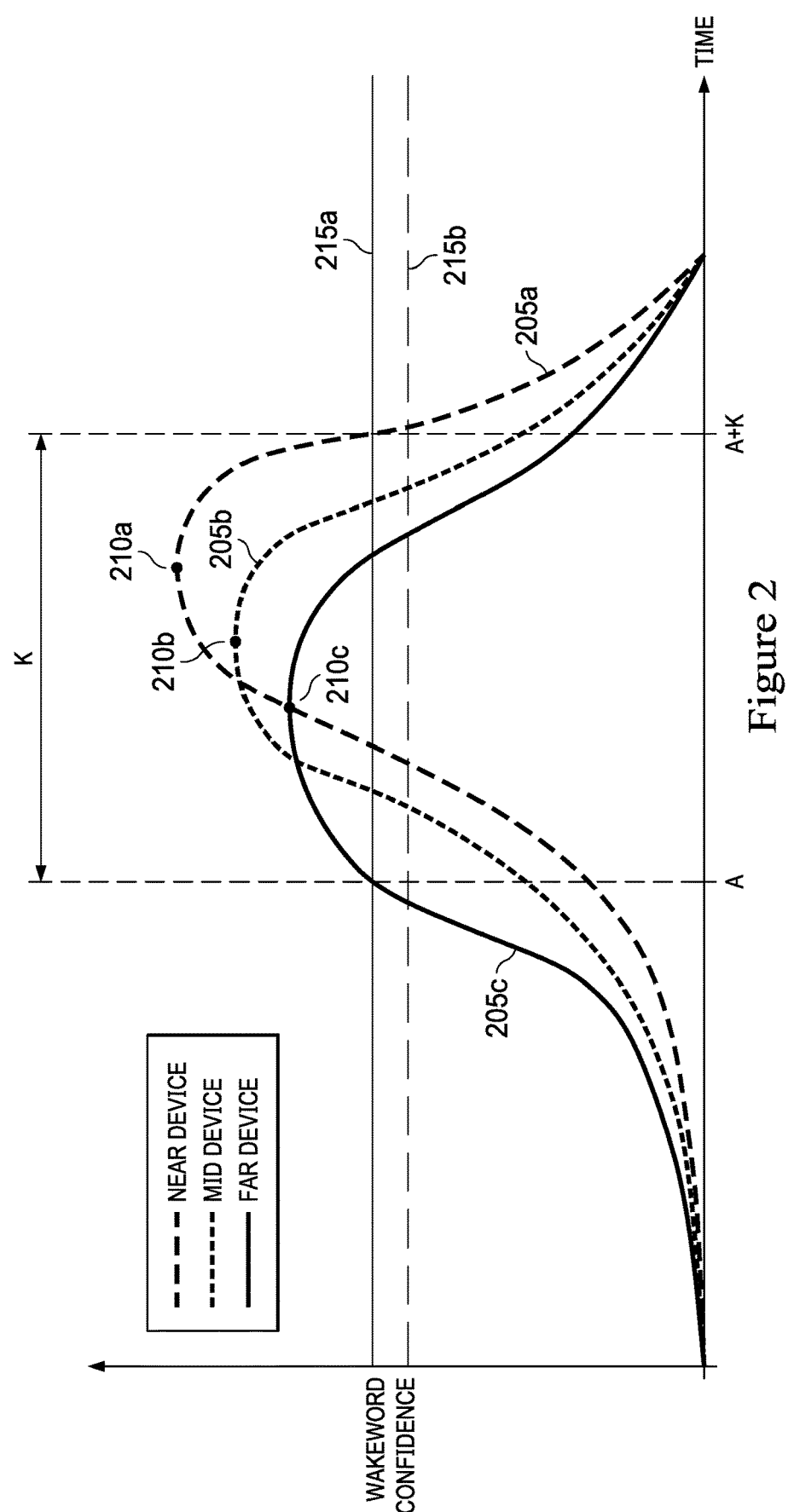
FIG. 2 shows examples of wakeword confidence value curves determined by three devices.

FIG. 2 shows examples of wakeword confidence value curves determined by three devices. The dotted curve 205*a* shown in FIG. 2 indicates wakeword likelihood as a function of time, as determined by near device 103. The dashed curve 205*b* indicates wakeword likelihood as a function of time, as determined by mid-distance device 105. The solid curve 205*c* indicates wakeword likelihood as a function of time, as determined by far device 107.

As is apparent from inspection of FIG. 2, as time progresses, the wakeword likelihood determined by each of devices 103, 105, and 107 increases and then decreases (e.g., as it passes into and out of a history buffer of the relevant one of the devices). In some cases, the wakeword confidence of the far device (the solid curve in FIG. 2) might exceed the threshold before the wakeword confidence of the mid-distance device (the dotted curve of FIG. 2), which too might exceed the threshold before the wakeword confidence of the near device (the dashed curve of FIG. 2) does. By the time the near device's wakeword confidence reaches its local maximum (e.g., the greatest maximum value 210*a*, 210*b*, 210*c* of curves 205*a*, 205*b*, 205*c*, respectively, of FIG. 2), this event is usually ignored (by conventional approaches) in favor of selecting the device (the far device, in the FIG. 2 example) whose wakeword confidence (wakeword likelihood) first exceeds the threshold.

According to some examples, a local maximum may be determined subsequent to determining that a wakeword confidence value exceeds a wakeword detection start threshold, which may be a predetermined threshold. For example, referring to FIG. 2, in some such examples a local maximum may be determined subsequent to determining that a wakeword confidence value exceeds the wakeword detection start threshold 215*a*. In some such examples, a local maximum may be determined by detecting a decrease in a wakeword confidence value after a previous wakeword confidence value has exceeded the wakeword detection start threshold.

In some such implementations, a local maximum may be determined by detecting, after a previous wakeword confidence value has exceeded the wakeword detection start threshold, a decrease in a wakeword confidence value of audio frame as compared to a wakeword confidence value of a previous audio frame, which in some instances may be the most recent audio frame or one of the most recent audio frames. For example, a local maximum may be determined by detecting, after a previous wakeword confidence value has exceeded the wakeword detection start threshold, a decrease in a wakeword confidence value of audio frame n as compared to a wakeword confidence value of audio frame n-k, wherein k is an integer.

According to some such implementations, some methods may involve initiating a local maximum determination time interval after a wakeword confidence value of the first device, the second device or another device exceeds, with a rising edge, the wakeword detection start threshold. Some such methods may involve terminating the local maximum determination time interval after a wakeword confidence value of the first device, the second device or another device falls below a wakeword detection end threshold.

For example, referring again to FIG. 2, in some such examples a local maximum determination time interval may be initiated at a start time A, when a wakeword confidence value corresponding to any device of a group of devices exceeds the wakeword detection start threshold 215a. In this example, the far device is the first to have a wakeword confidence value exceed the wakeword detection start threshold, the time A of which is when the curve 205c exceeds the wakeword detection start threshold 215a. According to this example, the threshold 215b is a wakeword detection end threshold. In this example, the wakeword detection end threshold 215b is less than (lower than) the wakeword detection start threshold 215a. In some alternative examples, the wakeword detection end threshold 215b may be equal to the wakeword detection start threshold 215a. In still other examples, the wakeword detection end threshold 215b may be greater than the wakeword detection start threshold 215a.

According to some examples, the local maximum determination time interval may terminate after a wakeword confidence value of all devices in a group falls below the wakeword detection end threshold 215b. For example, referring to FIG. 2, the local maximum determination time interval may equal K time units and may terminate at an end time A+K, when a wakeword confidence value of the near device falls below the wakeword detection end threshold 215b. By the end time A+K, the wakeword confidence values of the far device and the mid-distance device had already fallen below the wakeword detection end threshold 215b. According to some examples, the local maximum determination time interval may end either when a wakeword confidence value of all devices in a group falls below the wakeword detection end threshold 215b or after a maximum time interval has elapsed, whichever is reached first.

FIG. 3 is a block diagram that shows examples of components of an apparatus capable of implementing various aspects of this disclosure. According to some examples, the apparatus 300 may be, or may include, a smart audio device (such as one of the smart audio devices 1.1 shown in FIG. 1A or one of the smart audio devices 103, 105 and 107 shown in FIG. 1B) that is configured for performing at least some of the methods disclosed herein. In other implementations, the apparatus 300 may be, or may include, another device that is configured for performing at least some of the methods disclosed herein, such as the smart home hub 740 that is described below with reference to FIG. 7, a laptop computer, a cellular telephone, a tablet device, a motor controller (e.g., a controller for a fan or other device capable of moving air within an environment, a controller for a garage door, etc.), a controller for a gas fireplace (e.g., a controller configured to change the flame level of a gas fireplace), etc. In some such implementations the apparatus 300 may be, or may include, a server.

In this example, the apparatus 300 includes an interface system 305 and a control system 310. The interface system 305 may, in some implementations, be configured for receiving input from each of a plurality of microphones in an environment. The interface system 305 may include one or more network interfaces and/or one or more external device interfaces (such as one or more universal serial bus (USB) interfaces). According to some implementations, the interface system 305 may include one or more wireless interfaces. The interface system 305 may include one or more devices for implementing a user interface, such as one or more microphones, one or more speakers, a display system, a touch sensor system and/or a gesture sensor system. In some examples, the interface system 305 may include one or more interfaces between the control system 310 and a memory system, such as the optional memory system 315 shown in FIG. 3. However, the control system 310 may include a memory system.

The control system 310 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 310 may reside in more than one device. For example, a portion of the control system 310 may reside in a device within one of the environments depicted in FIGS. 1A and 1B, and another portion of the control system 310 may reside in a device that is outside the environment, such as a server, a mobile device (e.g., a smartphone or a tablet computer), etc. In other examples, a portion of the control system 310 may reside in a device within one of the environments depicted in FIGS. 1A and 1B, and another portion of the control system 310 may reside in another device that is within the environment. For example, as noted below one device within an environment (e.g., a light) may, in some instances, provide attentiveness signals that correspond to another device (e.g., an IoT device). The interface system 305 also may, in some such examples, reside in more than one device.

In some implementations, the control system 310 may be configured for performing, at least in part, the methods disclosed herein. According to some examples, the control system 310 may be configured for implementing methods of generating a plurality of spatially-varying attentiveness signals, e.g., such as those disclosed herein. In some such examples, the control system 310 may be configured for a determining a relevance metric for at least one device.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 315 shown in FIG. 3 and/or in the control system 310. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 310 of FIG. 3.

In some examples, the apparatus 300 may include the optional microphone system 320 shown in FIG. 3. The optional microphone system 320 may include one or more microphones.

In some implementations, the apparatus 300 may include the optional light system 325 shown in FIG. 3. The optional light system 325 may include one or more lights, such as light-emitting diodes. According to some implementations, the apparatus 300 may include the optional speaker system 330 shown in FIG. 3. The optional speaker system 330 may include one or more speakers. In some examples, the control system may control the optional light system 325 and/or the optional speaker system 330 to generate attentiveness signals. In some such examples, the attentiveness signals may indicate a relevance metric of the apparatus 300, or a relevance metric of another device.

According to some such examples the apparatus 300 may be, or may include, a smart audio device. In some such implementations the apparatus 300 may be, or may include, a wakeword detector. For example, the apparatus 300 may be, or may include, a virtual assistant.

FIG. 4 is a flow diagram that outlines one example of a method that may be performed by at least one apparatus such as that shown in FIG. 3. The blocks of method 400, like other methods described herein, are not necessarily performed in the order indicated. In some examples, one or more blocks of method 400 may be performed concurrently. According to some such examples, one or more blocks of method 400 may be performed concurrently by multiple devices, e.g., by devices such as the apparatus shown in FIG. 3. Moreover, such methods may include more or fewer blocks than shown and/or described.

In this example, block 405 involves receiving output signals from each microphone of a plurality of microphones in the environment. In this example, each of the plurality of microphones resides in a microphone location of the environment and the output signals correspond to an utterance of a person. The utterance may, in some examples, be (or include) a wakeword. At least one of the microphones may be included in, or configured for communication with, a smart audio device.

In some implementations, a single device may receive output signals from each microphone of a plurality of microphones in the environment in block 405. According to some such examples, the single device may be located in the environment. However, in other examples the single device may be located outside the environment. For example, at least a portion of method 400 may, in some instances, be performed by a remote device such as a server.

In other implementations, multiple devices may receive the output signals in block 405. In some such implementations, a control system of each of a plurality of smart devices may receive output signals from multiple microphones of each smart device in block 405.

The microphones of different devices in the environment may or may may or may not be synchronous microphones, based on the particular implementation. As used herein, microphones may be referred to as "synchronous" if the sounds detected by the microphones are digitally sampled using the same sample clock, or synchronized sample clocks. For example, a first microphone (or a first group of microphones, such as all microphones of a first smart device) within the environment may sample audio data according to a first sample clock and a second microphone (or a second group of microphones, such as all microphones of a second smart device) may sample audio data according to the first sample clock.

According to some alternative implementations, at least some microphones, or microphone systems, of an environment may be "asynchronous." As used herein, microphones may be referred to as "asynchronous" if the sounds detected by the microphones are digitally sampled using distinct sample clocks. For example, a first microphone (or a first group of microphones, such as all microphones of a first smart device) within the environment may sample audio data according to a first sample clock and a second microphone (or a second group of microphones, such as all microphones of a second smart device) may sample audio data according to a second sample clock. In some instances, the microphones in an environment may be randomly located, or at least may be distributed within the environment in an irregular and/or asymmetric manner.

In the example shown in FIG. 4, block 410 involves determining, based at least in part on the output signals, a zone within the environment that has at least a threshold probability of including the person's location. For example, referring to FIG. 1A, in some examples only the devices 1.1 contain microphones and therefore can receive audio data with which to make an estimate of the location of a user (1.4) who issues a wakeword command Using various methods, information may be obtained collectively from these devices to provide a positional estimate (e.g., a fine-grained positional estimation) of the user who issues (e.g., speaks) the wakeword. Relevant methods include direction of arrival (DOA) estimation methods such as Time Difference of Arrival (TDOA) methods, beamforming methods (e.g., Maximum Variance Beamformer (MVB) and Delay and Sum Beamforming (DSB)), and multi-source localization methods such as MUltiple SIgnal Classification (MUSIC, which is an algorithm used for frequency estimation and radio direction finding), Steered-Response Power Phase Transform (SRP-PHAT, which is a beamforming-based approach that searches for a candidate position that maximizes the output of a steered delay-and-sum beamformer) and estimation of signal parameters via rotational invariant techniques (ESPRIT, which is a technique to determine parameters of a mixture of sinusoids in a background noise.

In such a living space there are a set of natural activity zones where a person would be performing a task or activity, or crossing a threshold. These action areas (zones) are where there may be an effort to estimate the location (e.g., to determine an uncertain location) or context of the user to assist with other aspects of the interface. In the FIG. 1A example, the key action areas are:

The kitchen sink and food preparation area (in the upper left region of the living space);

The refrigerator door (to the right of the sink and food preparation area);

The dining area (in the lower left region of the living space);

The open area of the living space (to the right of the sink and food preparation area and dining area);

The TV couch (at the right of the open area);

The TV itself;

Tables; and

The door area or entry way (in the upper right region of the living space).

It is apparent that there are often a similar number of lights with similar positioning to suit action areas. Some or all of the lights may be individually controllable networked agents.

In some examples, the goal is not to estimate the user's exact geometric location but to form a robust estimate of a discrete zone (e.g., in the presence of heavy noise and residual echo). As used herein, the "geometric location" of an object or a user in an environment refers to a location based on a coordinate system, whether the coordinate system is with reference to GPS coordinates, with reference to the environment as a whole (e.g., according to a Cartesian or polar coordinate system having its origin somewhere within the environment) or with reference to a particular device within the environment (e.g., according to a Cartesian or polar coordinate system having the device as its origin), such as a smart audio device. According to some examples, the estimate of a user's location in an environment may be determined without reference to geometric locations of the plurality of microphones.

In some examples, the user's zone may be estimated via a data-driven approach that involves a plurality of high-level acoustic features derived, at least partially, from at least one of the wakeword detectors. These acoustic features (which may include wakeword confidence and/or received level) may, in some implementations, consume very little bandwidth and may be transmitted asynchronously to a device implementing a classifier with very little network load. Some examples are disclosed in U.S. Provisional Patent Application No. 62/950,004, filed on Dec. 18, 2019 and entitled "Acoustic Zoning with Distributed Microphones," for example FIGS. 1D and 2 and the corresponding discussion on page 15, line 8 through page 21, line 29, which is hereby incorporated by reference. Data regarding the geometric locations of the microphones may or may not be provided to the classifier, depending on the particular implementation. As noted elsewhere herein, in some examples an estimate of a user's location in an environment may be determined without reference to geometric locations of the plurality of microphones.

Some such methods may involve receiving output signals from each microphone of a plurality of microphones in the environment. Each of the plurality of microphones may reside in a microphone location of the environment. In some examples, the output signals may correspond to a current utterance of a user.

Some such methods may involve determining multiple current acoustic features from the output signals of each microphone and applying a classifier to the multiple current acoustic features. Applying the classifier may involve applying a model trained on previously-determined acoustic features derived from a plurality of previous utterances made by the user in a plurality of user zones in the environment. Some such methods may involve determining, based at least in part on output from the classifier, an estimate of the user zone in which the user is currently located. The user zones may, for example, include a sink area, a food preparation area, a refrigerator area, a dining area, a couch area, a television area and/or a doorway area.

In some examples, a first microphone of the plurality of microphones may sample audio data according to a first sample clock and a second microphone of the plurality of microphones may sample audio data according to a second sample clock. In some examples, at least one of the microphones may be included in, or configured for communication with, a smart audio device. According to some examples, the plurality of user zones may involve a plurality of predetermined user zones.

According to some examples, the estimate may be determined without reference to geometric locations of the plurality of microphones. In some examples, the multiple current acoustic features may be determined asynchronously.

In some instances, the current utterance and/or the previous utterances may include wakeword utterances. In some examples, a user zone may be estimated as a class with maximum posterior probability.

According to some implementations, the model may be trained using training data that is labelled with user zones. In some instances, the classifier may involve applying a model trained using unlabelled training data that is not labelled with user zones. In some examples, applying the classifier may involve applying a Gaussian Mixture Model trained on one or more of normalized wakeword confidence, normalized mean received level, or maximum received level.

In some examples, training of the model may continue during a process of applying the classifier. For example, the training may be based on explicit feedback from the user.

Alternatively, or additionally, the training may be based on implicit feedback, such as implicit feedback regarding the success (or lack thereof) of beamforming or microphone selection based on an estimated user zone. In some examples, the implicit feedback may include a determination that a user has terminated the response of a voice assistant abnormally. According to some implementations, the implicit feedback may include a command recognizer returning a low-confidence result. In some instances, the implicit feedback may include a second-pass retrospective wakeword detector returning low confidence that the wakeword was spoken.

Returning to FIG. 4, in this example block 415 involves generating a plurality of spatially-varying attentiveness signals within the zone. According to this example, each attentiveness signal is generated by a device located within the zone and each attentiveness signal indicates that a corresponding device is in an operating mode in which the corresponding device is awaiting a command. Moreover, in this example each attentiveness signal indicates a "relevance metric" of the corresponding device.

The "corresponding device" may or may not be the device providing an attentiveness signal, depending on the particular implementation. For example, a virtual assistant may include a speaker system and/or a light system and may be configured to generate an attentiveness signal that indicates a relevance metric of the virtual assistant via the speaker system and/or a light system.

In some alternative examples, an attentiveness signal generated by a first device may indicate a relevance metric of a second device. In such examples, the second device is the "corresponding device" referenced in block 415. Referring to FIG. 1A, as noted above one or more of the microphones 1.5 may be part of, or associated with, one of the lights 1.2 and/or the speakers 1.3. Moreover, one or more of the microphones 1.5 may be attached to an appliance or to another device of the environment, some of which may be "smart devices" capable of being controlled, at least in part, according to voice commands. In some such examples, one or more of the lights 1.2 and/or the speakers 1.3 (that are determined to be within the zone according to output signals from associated microphones, as referenced in blocks 405 and 410) may be configured to generate an attentiveness signal for a corresponding appliance or other device of the environment (e.g., an IoT device) that is within the zone.

In some examples, the relevance metric may be based, at least in part, on an estimated distance from a location. In some examples, the location may be an estimated location of the person who made the utterance that is referenced in block 405. According to some such examples, the relevance metric may be based, at least in part, on an estimated distance from the person to the device corresponding to the attentiveness signal.

In some implementations, the estimated distance may be an estimated distance from one location (e.g., a light's location, a smart device's location, etc.) to an acoustic centroid of a plurality of microphones within the zone. For example, the estimated distance may be an estimated Euclidean distance from the acoustic centroid of the microphones within the zone. In other instances, the estimated distance may be an estimated Mahalanobis distance from the acoustic centroid of the microphones within the zone. In further instances, the relevance metric may be the posterior probability that the given light would be classified as being associated in the given zone if it were a microphone.

In some implementations, a control system may be configured to estimate posterior probabilities $p(C_k|W(j))$ of a feature set W(j) corresponding to an utterance, for example by using a classifier. The classifier may, in some such implementations, be a Bayesian classifier. Probabilities $p(C_k|W(j))$ may indicate a probability (for the $j^{th}$ utterance and the $k^{th}$ zone, for each of the zones $C_k$, and each of the utterances) that the user is in each of the zones $C_k$. These probabilities are an example of the output of such a classifier.

In some examples, the amount of attentiveness expression may be related (e.g., monotonically related) to $p(C_k|W(j))$. For example, in some instances if a lighting device of interest may not include any microphones, so the classifier may determine or estimate a proxy based on a relative position of the lighting device and nearby microphones.

According to some examples, a process of building and/or updating a zone location model may include the following:

1. Collect a set of zone classification posteriors $p(C_k|W(j))$ corresponding to a recent set of utterances $j=1 \ldots J$ (e.g., the set of the most recent 200 wakewords uttered in the household) along with the estimated position $x_j$ of the talker during each utterance in the set (e.g., in 3D Cartesian space);

2. Compute the "acoustic centroid" $\mu_k$ for each zone k (e.g., in 3D Cartesian space) as the weighted mean $$\mu_k = \frac{\Sigma_{j=1}^{J} x_j p(C_k \mid W(j))}{\Sigma_{j=1}^{J} p(C_k \mid W(j))};$$

and

3. Optionally, compute an "acoustic size and shape" of each zone, for example assuming a multivariate Gaussian distribution over Cartesian space. In some such examples, the process may involve computing a weighted covariance matrix, e.g., as follows:

$$\Sigma_k = \frac{\Sigma_{j=1}^{J} p(C_k \mid W(j))(x_j - \mu_k)^T (x_j - \mu_k)}{\Sigma_{j=1}^{J} p(C_k \mid W(j))}.$$

Then, given a new position y, a control system may be configured to do one or more of the following with the zone location model:

1. Compute the Euclidean distance $d_k = \sqrt{(y-\mu_k)^T(y-\mu_k)}$ and use $d_k$ (e.g., in meters) as the relevance metric. Some such examples may involve passing $d_k$ through a monotonic function $f(d_k)$ which maps $d_k$ into the range [0,1].

2. Compute the Mahalanobis distance $m_k = \sqrt{(y-\mu_k)^T \Sigma_k^{-1}(y-\mu_k)}$ and use $m_k$ (in units of standard deviations from the centroid) as the relevance metric. Some such examples may involve passing $m_k$ through a monotonic function $g(m_k)$ which maps $m_k$ into the range [0,1].

3. Evaluate the probability density of the multivariate Gaussian zone k model for location y:

$$P_k = \frac{1}{\sqrt{(2\pi)^3 |\Sigma_k|}} \exp((y - \mu_k)^T \Sigma_k^{-1}(y - \mu_k)).$$

Some such examples may involve normalizing the probability density for each zone y into posterior probabilities $$p_k = \frac{Pk}{\Sigma_{l=1}^{K} P_l}.$$

Some such implementations may involve directly using the posteriors $p_k$ as zone relevance metrics in the range [0, 1].

According to some examples, the relevance metric may be based, at least in part, on an estimated visibility of the corresponding device. In some such examples, the relevance metric may be based, at least in part, on the elevation of the corresponding device, e.g., the height of the corresponding device from a floor of the environment. According to some such examples, if the estimated distance from the person to two devices is the same, or substantially the same (e.g., within a threshold percent, such as 10%, 8%, 5%, etc.) and one device has a higher elevation than the other device, the higher device will be assigned a higher relevance metric. In some such examples, a weighting factor of the relevance metric may be based on the estimated visibility of the corresponding device. For example, the weighting factor may correspond to the relative distances from the floor of the aforementioned devices. In other examples, the estimated visibility of the corresponding device and the corresponding weighting factor may be determined according to the relative positions of the person and one or more features of the environment, such as interior walls, furniture, etc. For example, the weighting factor may correspond to a probability that the corresponding device will be visible from the person's estimated location, e.g., based on a known environment layout, wall positions, furniture positions, counter positions, etc.

According to some implementations, the relevance metric may be based, at least in part, on estimations of wakeword confidence. In some such examples, a relevance metric may correspond to an estimation of wakeword confidence. According to some such examples, the wakeword confidence units may be a percentage, a number in the range of [0,1], etc. In some instances, wakeword detectors may use a logarithmic implementation. In some such logarithmic implementations, a wakeword confidence of zero means the likelihood that the wakeword was spoken is the same as the likelihood that the wakeword was not spoken (e.g., according to a particular training set). In some such implementations, increasingly positive numbers may indicate an increasing confidence that the wakeword was spoken. For example, a wakeword confidence score of +30 may correspond with a very high likelihood that the wakeword was spoken. In some such examples, negative numbers may indicate that it is unlikely that the wakeword was spoken. For example, a wakeword confidence score of −100 may correspond with a high likelihood that the wakeword was not spoken.

In other examples, a relevance metric for a particular device may be based on an estimation of wakeword confidence for that device as well as the estimated distance from the person to the device. For example, the estimation of wakeword confidence may be used as a weighting factor that is multiplied by the estimated distance to determine the relevance metric.

The attentiveness signals may, for example, include light signals. In some such examples, the attentiveness signals may vary spatially within the zone according to color, color saturation, light intensity, etc. In some such examples, the attentiveness signals may vary spatially within the zone according to a rate at which lights are blinking. For example, lights that are blinking more quickly may indicate a relatively higher relevance metric of the corresponding device than lights that are blinking more slowly.

Alternatively, or additionally, the attentiveness signals may, for example include sound waves. In some such examples, the attentiveness signals may vary spatially within the zone according to frequency, volume, etc. In some such examples, the attentiveness signals may vary spatially within the zone according to a rate at which a series of sounds are being produced, e.g., the number of beeps or chirps in a time interval. For example, sounds that are being produced at a higher rate may indicate a relatively higher relevance metric of the corresponding device than sounds that are being produced at a lower rate.

Referring again to FIG. 4, in some implementations optional block 420 may involve selecting a device for subsequent audio processing based, at least in part, on a comparison of the relevance metrics. In some such implementations, method 400 may involve selecting at least one speaker of a device located within the zone and controlling the at least one speaker to provide sound to the person. Some such implementations may involve selecting at least one microphone of a device located within the zone and providing signals output by the at least one microphone to a smart audio device. In some implementations, the selection process may be automatic, whereas in other examples the selection may be made according to user input, e.g., from the person who made the utterance.

According to some examples, the attentiveness signals may include a modulation of at least one previous signal generated by a device within the zone prior to a time of the utterance. For example, if a light fixture or a light source system had previously been emitting light signals the modulation may be a color modulation, a color saturation modulation and/or a light intensity modulation. If the previous signal had been a sound signal, the modulation may have included a level or volume modulation, a frequency modulation, etc. In some examples, the modulation may be a change of a fan speed, a change of a flame size, a change of a motor speed and/or a change of an air flow rate.

According to some implementations the modulation may be a "swell." The swell may be, or may include, a predetermined sequence of signal modulations. Some detailed examples are described below. Some such implementations may involve the use of variable output devices (which may, in some instances, be continuously variable output devices) in the system environment (e.g., the lights, speakers, fans, fireplace, etc., of a living space) that may be used for another purpose but are able to be modulated around their current operating point. Some examples may provide variable attentiveness indication(s) (e.g., varying attentiveness signals which have a swell), for example to indicate a varying expression (e.g., a varying amount) of attention across a set of devices. Some implementations may be configured to control variable attentiveness signal(s) (e.g., a swell) based on a function of estimated intensity of user signaling and/or confidence of user location(s).

Figure 5:
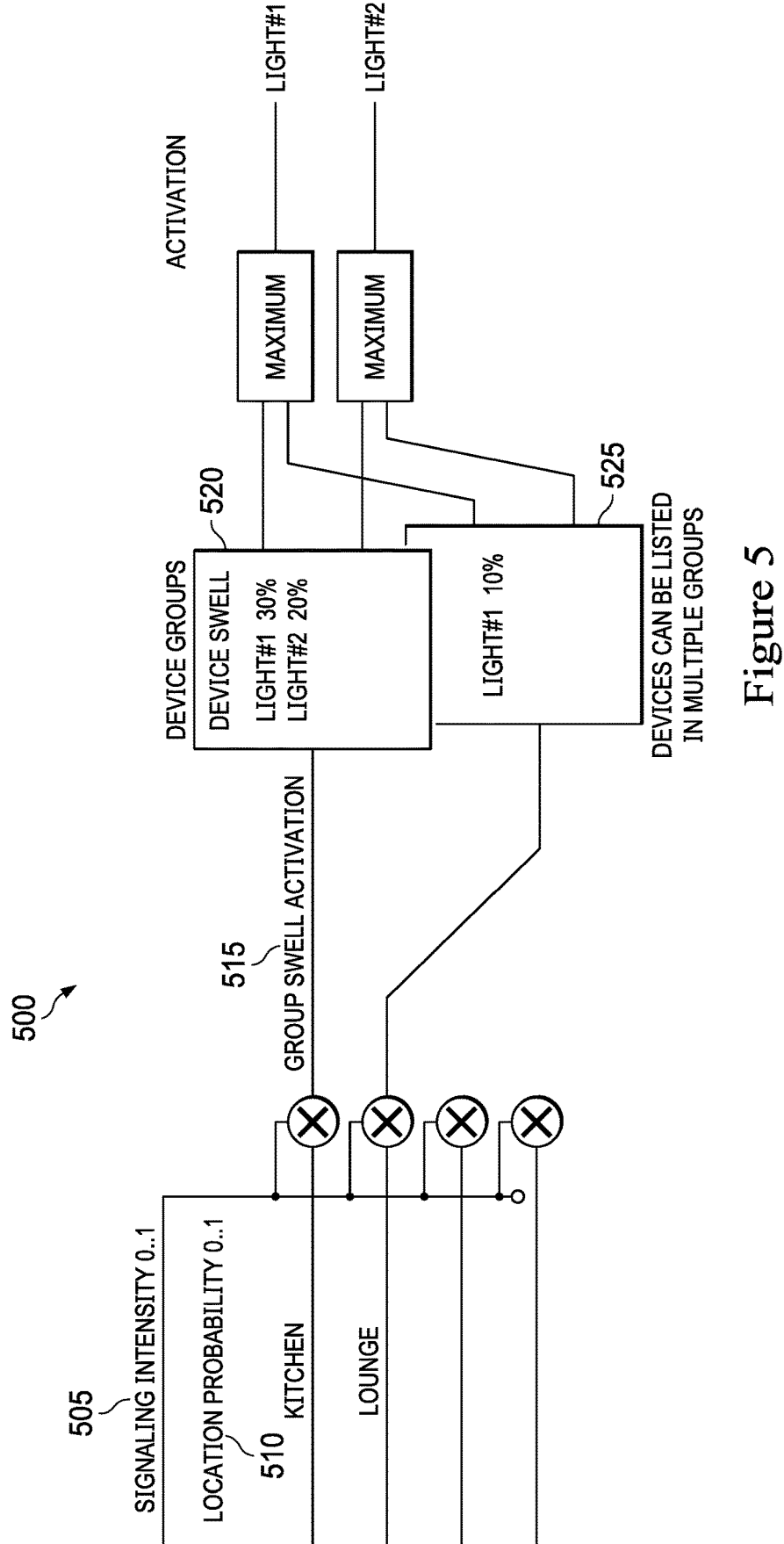
FIG. 5 is a block diagram showing examples of features according to some implementations.

FIG. 5 is a block diagram showing examples of features according to some implementations. In this example, FIG. 5 indicates a process 500 for variable signaling intensity 505 (e.g., of a wakeword uttered by a user), and variable probability of location 510 of the source of the variable signal. FIG. 5 also indicates responses to the variable signaling of different smart audio devices (e.g., virtual assistants). The devices are in device groups 520 and 525, and they include or are associated with (e.g., are configured for communication with) activatable lights. As indicated in FIG. 5, each of the devices can be included in different groups. The "device groups" of FIG. 5 are based on a corresponding zone, such as lounge, kitchen, etc. For example, device group 520 are based on the kitchen zone and respond to group swell activation 515. It's possible that one zone may contain multiple audio devices and/or lights. Zones can overlap, so any audio device, light, etc. may be in multiple zones. Accordingly, lights, audio devices, etc., may be associated with zones instead of, or in addition to, being associated with devices. Certain lights, audio devices, etc., may be more strongly (or more weakly) associated with each zone and therefore may be associated with different swell percentages. The swell percentages may, in some examples, correspond to relevance metrics. In some implementations these relevance metrics may be manually set up and captured in a table, e.g., as shown in FIG. 5. In other examples the relevance metrics may be automatically determined from distance heuristics or probabilities, e.g., as described above.

For example, in response to a wakeword (having determined intensity and having a location of origin which is determined with uncertainty), two different lights of, or associated with, the devices may be activated to produce time-varying attentiveness signals. Because in this example the attentiveness signals are based in part on an estimated distance between a device and the location of origin of the wakeword, which varies according to the location of each device, the attentiveness signals are also spatially-varying.

In the example shown in FIG. 5, the signaling intensity (505) may correspond, for example, to the "wakeword confidence" discussed above. In this example, the location probabilities for all the zones (kitchen, lounge, etc.) 510 correspond to the zone probabilities (e.g., in the range [0,1]) discussed above. FIG. 5 shows an example in which there is different behavior (which may correspond to "relevance metrics") of each light corresponding to each zone. If a light, an audio device, etc., is associated with multiple zones, in some implementations a control system may be configured to determine the maximum of the outputs of each of the relevant zones.

Variable Output Devices

Without loss of generality, Table 1 (below) indicates examples of devices (e.g., smart audio devices, each of which includes or is associated with (e.g., configured for communication with) a controllable light-emitting, sound-emitting, heat-emitting, moving, or vibrating element) which are useful as variable, and in some instances continuously variable, output devices. In these examples, the output of each variable output device is a time-varying attentiveness signal. Table 1 indicates some ranges of modulation of sound, light, heat, air movement, or vibration (each serving as an attentiveness signal) emitted from or produced by each of the devices. Although a single number is used to indicate some of the ranges, the single number indicates a maximum change during a "swell" and therefore indicates a range from a baseline condition to the indicated maximum or minimum value. These ranges are merely made by example and are not limiting. However, each range provides an example of a minimum detectable change in the indication and a maximum (commanded) attention indication.

For example, having determined an "attentiveness signal" (e.g., in the range [0,1]) for each modality there may be an "attentiveness-to-swell" mapping from that attentiveness signal. In some examples, the attentiveness-to-swell mapping may be a monotonic mapping.

The attentiveness-to-swell mapping may, in some instances, be set heuristically or experimentally (for example on a demographically-representative group of test subjects) so that the mapping seems "natural," at least to a group of individuals who have provided feedback during the testing procedures. For example, for color change modality an attentiveness of 0.1 may corresponds to +20 nm of hue, whereas an attentiveness of 1 may corresponds to +100 nm of hue. Color-changeable lights will generally not change the frequency of the transducer, but may instead have separate R, G, B LEDs which may be controlled with varying intensities, so the foregoing are merely a rough examples. Table 1 provides some examples of some natural mappings of attentiveness to produced physical phenomena, which will generally differ from modality to modality.

TABLE 1

| DEVICE | Type of Control and notes | Detectable | Commanded |
|---|---|---|---|
| Lights | Intensity (Only increases in illumination are indicated, which are more natural) | +10-20% | +100% |
| Lights | Color change in hue | +/−20 nm | +/−100 nm |
| Lights | Color change in saturation (only additions to saturation are indicated, which are more natural) | +20% | +50% |
| Sound | Ducking (alternatively, more than the indicated ducking may be implemented, for softer signaling, e.g., for a quieter user) | −3 dB | −20 dB |
| Heat | Controllable (for example, fires can swell quite effectively) | +10-20% | +100% |
| Air Movement | | +0.1 m/s | +1 m/s |
| Vibration | Usually not present in a scene | | |

Figure 6:
FIG. 6 is a graph that shows an example of a swell.

FIG. 6 is a graph that shows an example of a swell. As with other figures provided herein, the time intervals, amplitudes, etc., shown in graph 600 are merely made by way of example. Herein, we define "swell" (with reference to a swell in an attentiveness signal) as a determined (e.g., predetermined) sequence of signal modulations, such as attentiveness signal modulations. In some instances, a swell may include a distinct envelope of attentiveness signal modulations. A swell may be designed to provide a timing of attentiveness signal modulations that reflects a natural cadence of attention (or attentiveness). The trajectory of a swell is sometimes designed to avoid any sense of abrupt change at the edge points, e.g., at the beginning and end of the swell.

In this example shown in FIG. 6 the graph 600 provides an example of an envelope of change of a swell of an attentiveness signal, which is also referred to herein as a swell envelope. The swell envelope 601 includes an attack 605, which is an attentiveness signal level increase from a baseline level 603 to a local maximum level 607 during a first time interval. The first time interval is from time=0 to about the time=500 ms in this example. As noted in Table 1, the local maximum level 607 may vary according to the type of attentiveness signal (e.g., whether light, sound or other), how the signal will be modulated (e.g., light intensity, color or color saturation change) and whether the attentiveness signal is intended to correspond to a "detectable" or "commanded" condition. In other examples, such as the sound example shown in Table 1, the first time interval of the swell may correspond to an attentiveness signal level decrease from a baseline level 603 to a local minimum level.

In the example shown in FIG. 6, the swell envelope 601 includes a release 620, which is an attentiveness signal level decrease to the baseline level 603. According to this example, the release 620 begins at about the time=N seconds and lasts for approximately 2 seconds. Both N and the duration of the release 620 may vary according to the particular implementation. In some examples, N may be 4 seconds, 5 seconds, 6 seconds, 7 seconds, 8 seconds, 9 seconds, 10 seconds, etc. In some instances, N may be responsive to conditions in the environment. For example, the release 620 may begin if a person who uttered a wakeword has moved away from a zone in which a corresponding device is located. In other examples, the duration of the release 620 may be greater than or less than 2 seconds.

According to the example shown in FIG. 6, the swell envelope 601 includes a decay 610, which is an attentiveness signal level decrease from the local maximum level 607 to an intermediate or mid-level amplitude 615 that is between the local maximum level 607 and the baseline level 603. According to this example, the decay 610 occurs from about the time=500 msec to about the time=1 sec.

In this instance, the swell envelope 601 also includes a hold 617, during which the attentiveness signal level remains the same. In some implementations, the attentiveness signal level may remain substantially the same during the hold 617, e.g., may remain within a determined percentage of the attentiveness signal level at the beginning of the hold 617 (e.g., within 1%, within 2%, within 3%, within 4%, within 5%, etc.). In the example shown in FIG. 6, the hold 617 lasts from about the time=1 sec to about the time=N sec.
Estimated Intensity In some example embodiments, the normalized intensity of an attentiveness signal may vary from 0 (for a threshold detection of wakeword), through to 1 (for a wakeword having an estimated vocal effort causing voice levels 15-20 dB above normal).
Function for Modulating Swell of a Device An example of a function for modulating the swell of an attentiveness signal having an initial intensity "Output" is:

$$Output=Output+Swell*Confidence*Intensity,$$

where the parameters Swell, Confidence, and Intensity may vary with time.

The control of large numbers of devices of an Internet of things (IoT), such as lights, is complicated of itself before introducing a step of swelling for expression of attention. Some embodiments have been designed with this in mind, e.g., in the sense that a swell is typically a short-term additive delta to whatever setting is occurring due to the broader scene or space context control.

In some implementations, the scene control may involve occupancy, and may be shaped additionally by and during voice commands that relate to the control of the system being coopted for expressing attention. For example, audio attentiveness signals may be kept within a relatively lower amplitude range if more than one person is within a zone.

Some embodiments provide a way to implement such scene control from implementation of a swell. In some implementations, the swell of attentiveness signals for multiple devices may be controlled according to a separate protocol (in other words, separate from other protocols for controlling functionality of the devices), enabling the devices to participate in the human attention cycle as well as be controlled for the ambience of a living space.

Aspects of some embodiments may include the following:
Continuous output actuators;
Assignment of smart audio devices into activation groups, in some instances with devices assigned to more than one group;
Swell with one or more designed temporal envelope(s);
Range of swell controlled by a simple function of activation intensity and zone (or location) confidence.

Some examples of how a virtual assistant (or other smart audio device) may be controlled to exhibit an ambient presence create testable criteria that are not well represented in prior systems may include the following:
confidence scores (such as wakeword confidence scores) computed based on the estimation of a user's intent or invocation of the virtual assistant with specific contextual information (such as the location and/or zone in which the wakeword was spoken) may be published (e.g., shared between smart devices in an environment), and at least in some examples are not directly used to control the devices;
suitably equipped devices with continuous electrical control may be controlled to use this information to "swell" their existing state to respond naturally and with reciprocity;
the self-delegation of devices (e.g., automated discovery of and/or dynamic updating of zones by the devices) to perform "swells" may create emergent responses that do not require manual tables of positions and "zones," and the added robustness afforded by the low user set-up requirements; and
the continuous estimation, publishing, and growing confidence through an accumulation of statistical samples (e.g., via explicit or implicit user feedback), enables the system to create a semblance of presence that may, in some examples, move across space naturally, and in some examples may modulate in accordance with increased efforts by the user to address the assistant.

Figure 7:
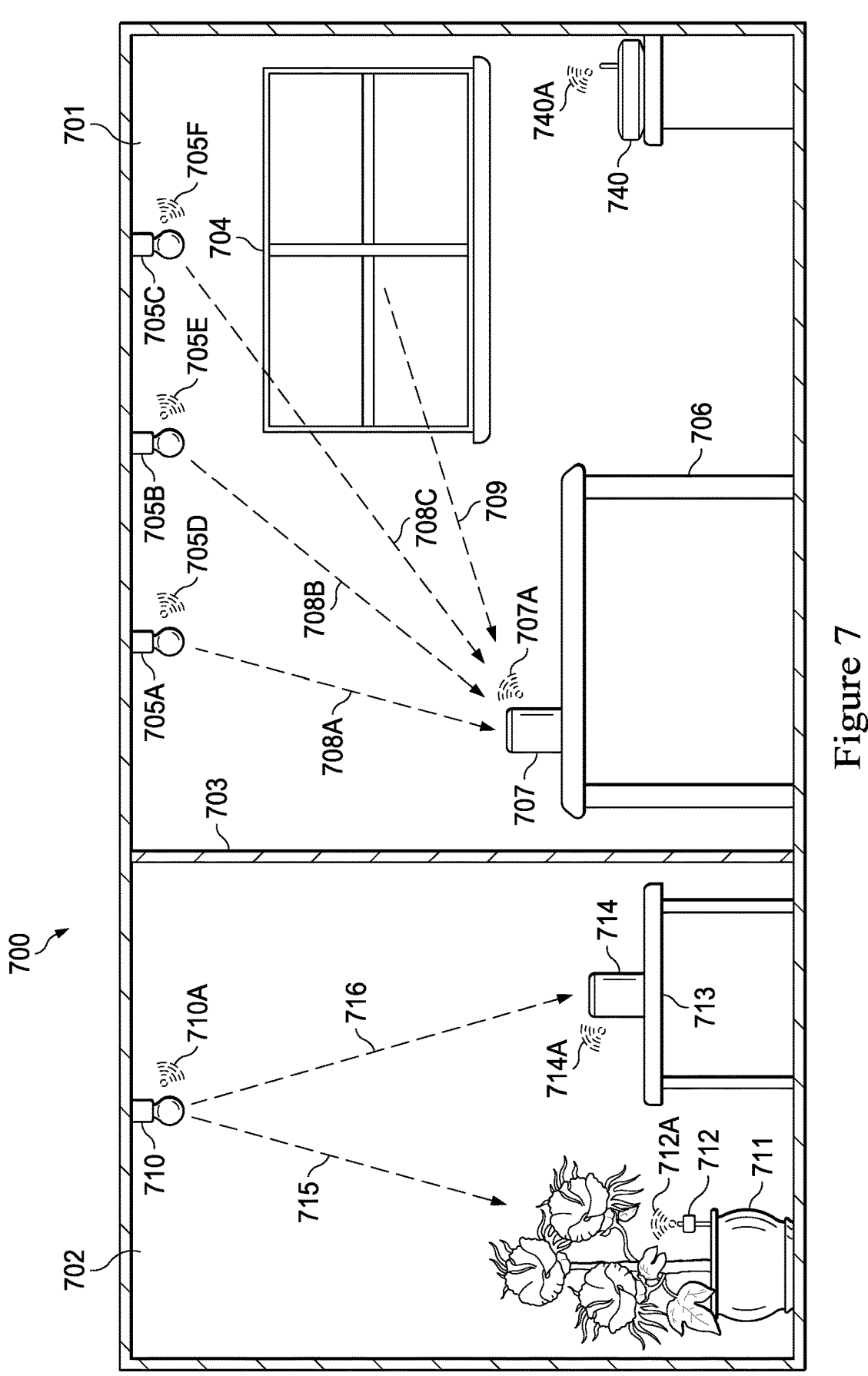
FIG. 7 shows an example embodiment of a system for implementing automatic optical orchestration.

FIG. 7 shows an example embodiment of a system for implementing automatic optical orchestration.

Elements of FIG. 7 include:
700: Example home illustrating automatic optical orchestration, here a two room apartment;
701: Living room;
702: Bedroom;
703: Wall between living room and bedroom. According to this example, light cannot pass between the two rooms;
704: Living room window. Daylight illuminates the living room via this window during daytime hours;
705A-C: Plurality of smart ceiling (e.g., LED) lights illuminating the living room;
705D-F: Each ceiling light is orchestrated and communicates by Wi-Fi (or another protocol) with the smart home hub 740;
706: Living room table;
707: Living room smart speaker device incorporating light sensor;

707A: Device 707 is orchestrated by and communicates by Wi-Fi (or another protocol) with the smart home hub 740;
708A-C: Controlled light propagation from the lights 705A-C to the device 707;
709: Uncontrolled light propagation from the window 704 to the device 707;
710: Smart ceiling LED light illuminating the bedroom;
710A: The bedroom light is orchestrated by and communicates by Wi-Fi (or another protocol) with the smart home hub 740;
711: Potted plant;
712: IoT (internet of things) automatic watering device incorporating light sensor;
712A: IoT watering device is orchestrated by and communicates by Wi-Fi (or other protocol) with the smart home hub 740;
713: Bedroom table;
714: Bedroom smart speaker device incorporating light sensor;
714A: Bedroom smart speaker is orchestrated by and communicates with the smart home hub 740 by Wi-Fi or another protocol;
715: Controlled light propagation from the bedroom light 710 to the IoT watering device 712; and
716: Controlled light propagation from the bedroom light 710 to the bedroom smart speaker 714.

According to this example, the smart home hub 740 is an instance of the apparatus 300 that is described above with reference to FIG. 3 and communicates 740A with other devices using Wi-Fi (or another protocol).

Figure 8:
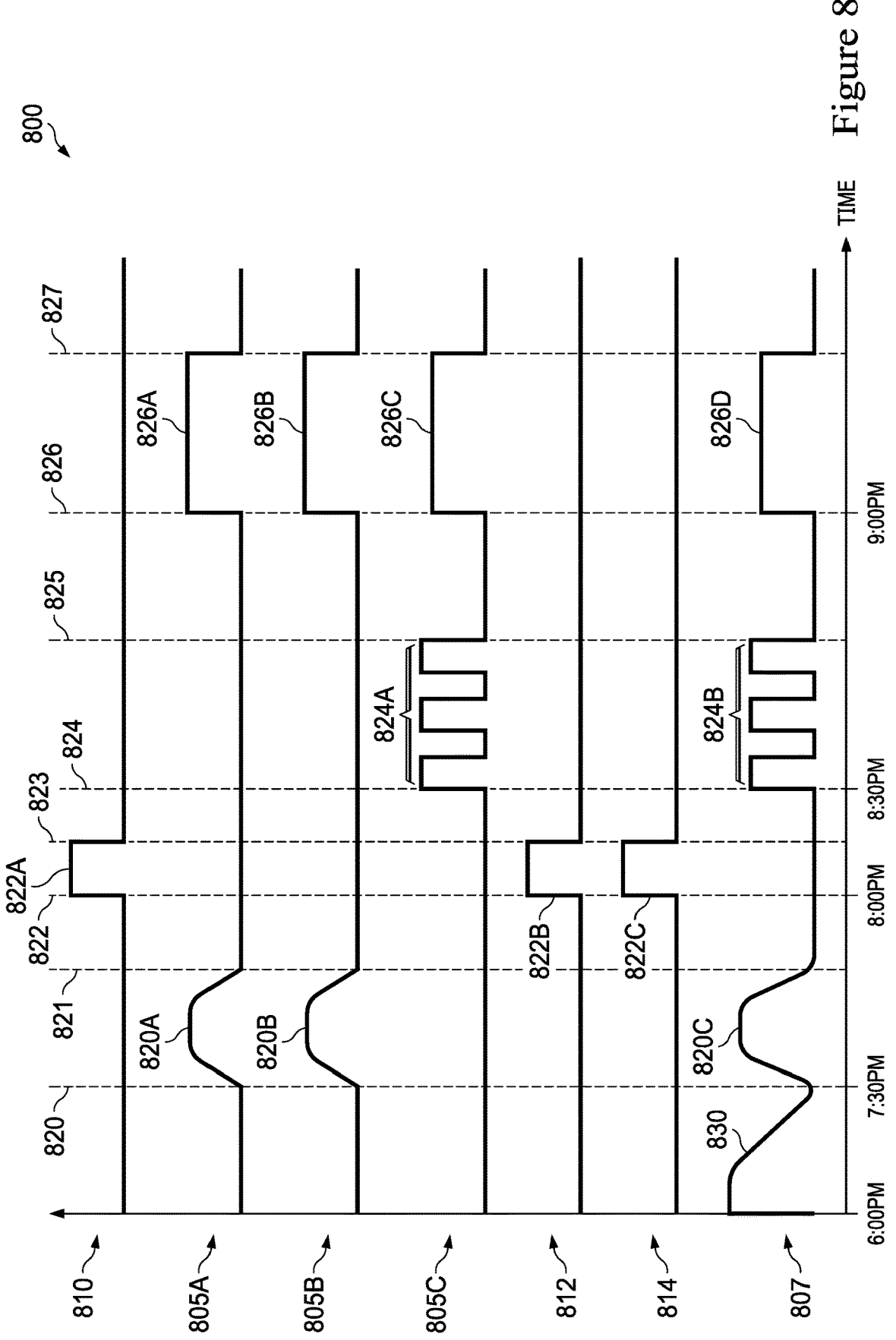
FIG. 8 is a set of graphs illustrating examples of aspects of operation of the FIG. 7 system.

FIG. 8 is a set of graphs illustrating examples of aspects of operation of the FIG. 7 system. Elements of FIG. 8 include:
800: Graph displaying the continuous value of light intensity settings (810, 805A, 805B, and 805C) for an example set of smart lighting devices pictured in FIG. 7 (710, 705A, 705B, and 705C, respectively). Graph 800 also displays on the same time axis the continuous light sensor readings (812, 814, and 807) for the example light sensors pictured in FIGS. 7 (712, 714 and 707, respectively);
810: The continuously controlled light intensity output for smart lighting device 710. The value at time 6:00 pm corresponds to the light completely off;
805A: The continuously controlled light intensity output for smart lighting device 705A. The value at time 6:00 pm corresponds to the light completely off;
805B: The continuously controlled light intensity output for smart lighting device 705B. The value at time 6:00 pm corresponds to the light completely off;
805C: The continuously controlled light intensity output for smart lighting device 705C. The value at time 6:00 pm corresponds to the light completely off;
812: The continuous light sensor reading for the example light sensor 712. The reading at time 6:00 pm is low;
814: The continuous light sensor reading for the example light sensor 714. The reading at time 6:00 pm is low;
807: The continuous light sensor reading for the example light sensor 707. The reading at time 6:00 pm is high;
830: The continuous light sensor reading is initially high due to daylight (709) entering through the window (704). As dusk falls, the ambient light intensity falls until 7:30 pm;
820: An event that occurs at 7:30 pm when two smart lighting devices (705A, 705B) are switched on by a user in response to the low light conditions in the room (706). The light intensity of the smart lighting devices 705A and 705B are increased as shown in the traces 820A and 820B. At the same time, the continuous light sensor reading at 820C increases with a discernibly similar response;

821: The event of 820 ends when the smart lighting devices 705A and 706B are switched off. The traces 820A and 820B correspondingly return to completely off, and the light sensor readings 807 return low;

820A: The increase and decrease of light output of smart lighting device 705A when it is switched on and then off;

820B: The increase and decrease of light output of smart lighting device 705B when it is switched on and then off;

820C: The increase and decrease of light output of the light sensor readings of sensor 707 in response to the lights 705A and 705B being switched on and off;

822: An event that occurs at 8:00 pm when the smart lighting device 710 is switched on and then off (823). The light intensity of the device modulates with the response 822A. The light sensor readings 812 and 822 then modulate with discernibly similar responses 822B and 822C;

824: An event that occurs at 8:30 pm when a new smart lighting device 705C is connected to the system. The light output is modulated either through an automatic sequence or by a user manually controlling the output of the light in an on/off pattern shown by 824A;

824A: The modulated output pattern of light 705C; 824B: In response to the modulation of smart light 705C, the continuous light sensor 707 reads a discernibly similar response 824B;

825: The event of 824 finishes;

826: In response to a user request, the lights in room 701 are enabled to a dim setting around 50% intensity. These lights are 705A, 705B, and 705C, with their 50% output intensity shown in the traces 826A, 826B, and 826C, respectively. Correspondingly, the continuous light sensor reading of sensor 707 modulates with a discernibly similar response; and

827: The event of 826 ends.

The management and enrolment of networked devices in the home and workplace presents a growing challenge as the number of such devices is surging rapidly. Lighting, furniture, appliances, mobile phones, and wearables are all becoming increasingly connected, and present manual methods of installing and configuring such devices are not sustainable. Supplying network authentication details and pairing devices with user accounts and other services is just one example of the kind of enrolment devices need when initially installed. Another common step of enrolment and installation is the assignment of a particular "zone" or "group" to a set of devices, organizing them into a logical category often associated with specific physical spaces such as rooms. Lighting and appliances which are usually statically installed fall into this category most often. The labour and additional installation steps associated with assigning these "zones" or "groups" to devices presents a usability challenge for users and lowers their attractiveness as commercial products.

The present disclosure recognizes that these logical groupings and zones are sensical in the context of home automation, but may be too rigid to provide the level of expression and fluidity desirable for human/machine interaction as users navigate the space. In some examples, the ability to modulate and swell the continuously variable output parameters of a collection of devices to best express attention may require that the system possesses some knowledge about the distribution or relevance of these devices that is more finely granulated or pertinent than the typical rigidly and manually assigned "zones." Herein we describe an inventive approach to automatically map such a distribution by aggregating both the readings produced by a plurality of sensors, and the opportunistic sampling of the continuous output configurations of a plurality of smart devices. Herein we motivate the discussion with an example using light, so using one or more light-sensitive components with digitizable output readings attached to one or more smart devices, and the self-reported light intensity and hue output parameters for a plurality of smart lighting devices. However, it will be understood that other modalities such as sound, temperature (with a temperature measurement component, and smart connected heating and cooling appliances) are also possible embodiments of this method and approach.

With reference to FIGS. 7 and 8, we illustrate an example scenario using light as the modality to create a mapping relating light emitting smart devices to smart assistant devices that employ integrated or otherwise physically attached light sensors. FIG. 7 depicts an example environment divided into two discrete zones for the purposes of clarity in the following explanation. FIG. 8 depicts the signals measured by the system for the purposes of analysis in order to determine the mapping relating controllable light emitting devices to smart assistant devices that employ light sensors.

In our example, all smart lighting devices (710, 705A, 705B, and 705C) are initially emitting no light at 6:00 pm, seen in the traces 810, 805A-C, respectively. Devices 710, 705A and 705B are all presently installed and already mapped, while 705C is a new device that is not yet mapped by the system. The light sensor readings (812, 814, and 807) of three smart devices (712, 714, and 707 respectively) are also depicted. It should be understood that the vertical and horizontal axes (in FIG. 8) are not to scale and that the light sensor readings in this case may not have identical scaling to the smart light output parameters. It should also be understood that only the light intensity is shown here as an example, and that light hue output parameters as well as a multitude of light sensors sampling different parts of the light spectrum are also encompassed by some disclosed embodiments.

In our example, room 702 is a bedroom and room 701 is a living room. Room 702 contains one smart light emitting device 710 and two smart devices with light sensing capability, 712 (an IoT watering device) and 714 (a smart speaker). Room 701 contains two initially installed and mapped smart lights 705A and 705B, and one new unmapped smart light 705C. Room 702 also contains one smart speaker device 707, which possesses light sensing capability. A window 704 is also present in room 702, producing an uncontrolled amount of ambient light.

In our example, all smart devices are equipped to communicate over a home or local network, either via WiFi or via some other communication protocol, and that information collected or stored at one device may be transmitted to an orchestrating hub device 740. At time 6:00 pm, no light is produced by any of the smart lighting devices 710, 705A-C, however there is light emitted through the window 704 in room 701. Hence the light sensor readings for room 702 are low, and the readings for room 701 are high.

A series of events corresponding to changes in the lighting conditions will occur, and it will be demonstrated that corresponding changes in the light sensor readings will be sufficient to establish a basic mapping between the smart sensing devices and the smart light emitting devices. Trace 820 depicts the sensor readings of device 707 reducing as the sun sets, and the amount of light produced (709) through the window 704 is reduced. At 7:30 pm event 820 occurs, as a user switches on the lights in the living room 701. Hence the light outputs 805A and 805B increase, as shown by the profiles 820A and 820B. Correspondingly, the light sensor readings 807 increase with the profile 820C. Notably, the light sensor readings 812 and 814 corresponding to the device 712 and 714 in the adjacent room are not changed by this event. The event ends at the horizontal time marked by 821, when the lights are switched off again.

In a similar fashion to event 820, event 822 begins at time 8:00 pm when the bedroom light is switched on. The continuously variable output parameter (810) of the bedroom light (710) is increased with the profile 822A during this event. The light sensor readings (812 and 814) of smart devices 712 and 714 also modulate in a corresponding fashion with the profiles 822B and 822C respectively. Notably, the light sensor reading 807 is unaffected as it is in the adjacent room. At 823 the event ends as the bedroom light 710 is switched off.

At 8:30 pm the unmapped living room light 805C is toggled on and off in a periodic fashion for some short duration of time. This toggling could have been automatically initiated by the lighting device itself, or at the request of the smart hub 740, or manually by a user using a physical switch or by alternatively suppling power to and removing power from the device. Regardless of how this modulation in output (identifiable with profile 824A) was achieved, the reported output intensity (805C) of device 705C is communicated via the network for aggregation with the light sensor readings 812, 814 and 807. As in event 820, the only sensor in the living room (attached to device 707) reflects the output modulation 824A with a discernibly similar pattern 824B in the sensor reading. This event ends sometime shortly after it begins, as indicated by numeral 825.

With the data aggregated by the system up until this point, it is possible to deduce that the unmapped smart light 705C is strongly related to the lights 705A and 705B. This is because the degree to which 705A and 705B affect the light sensor readings (807) through the transmission of light 708A and 708B is highly similar to degree to which the light emitted (708C) by 705C affects the same sensor. The degree of similarity (determined by a convolutional process about to be discussed in greater detail) determines to what degree the lights are co-located and contextually related. This soft decision and approximate relational mapping provides an example of how finer grained "zoning" and spatial awareness is afforded to the smart assistant system.

With the smart light 705C now effectively mapped, an example of a user request to switch on all the "living room" lights to 50% intensity is depicted in event 826. All three living room lights 705A-C are enabled at 50% output, depicted in the output traces 805A-C and follow profiles 826A-C. Correspondingly, the light sensor reading 807 also modulates with a profile 826D. The degree to which a device is "mapped" will increase in confidence over time, with the accumulation of correlated modulations observed in the output of the device and the readings of the sensor in question. So even though the new device 705C has been at least understood to co-exist with 705A and 705B, further analysis of events such as 826 occurring after the initial setup period should be understood as data to build an increasingly detailed and confident spatial map of the space that may be used to facilitate expressive personal assistant interactions as previous discussed in this disclosure.

It will be understood that light sensors may incorporate specific filters to more selectively sense light produced by consumer and commercial LED lighting devices, removing spectra of light produced by uncontrollable light sources such as the sun.

It will be understood that the events of 824 in the example are optional from the point of view of the system. However, in this example the rate at which a device is mapped into the system is directly proportional to the how often it modulates output parameters. With this in mind, it will be expected that devices can be more quickly integrated into the system's mapping with highly discernible modulation events such as 824 that encode a high degree of information from an informational theory standpoint.

Some embodiments may be configured to implement continuous (or at least continued and/or periodic) re-mapping and refinement. The events described through the example of FIGS. 7 and 8 capture both the regular use of "already mapped" devices by the user as well as the installation of a new lighting device. To implement an automated setup and mapping approach, the system preferably should not require user intervention or manual operation of the lighting devices. That is why the event 824 (in FIG. 8) may be initiated by the user, or equivalently initiated by the smart light itself either by its own discretion or by instruction from a hub or other external orchestrating device. This kind of obviously detectable modulation event carries a high degree of information and helps the rapid induction of a new device into a system's mapping.

We next discuss a subtler and complementary form of modulation that is explicitly not driven by user intervention, referred to herein as "pervasive refinement." A system may continuously adjust the output parameters of individual smart devices in a slow-moving fashion that is minimally detectable to users, but discernible to smart sensors, in order to build a mapping with increasingly higher fidelity. Instead of relying on the user to operate the system in a way that produces unambiguous information to correlate—the system can take control and perform its own modulation of individual smart output devices, again in a fashion that is only minimally detectable to users, and still discernible to sensors.

Many examples of this approach are possible (with light modality focus). Examples are shown in the following table:

| | Behavior | Time-scale | Degree of user detectability | Information level | Information type |
|---|---|---|---|---|---|
| NIGHTTIME ONE-HOT | During the night or other times when users are not present, | Minutes | Extremely low | High | Higher fidelity between nearby lights |

-continued

| Behavior | Time-scale | Degree of user detectability | Information level | Information type |
|---|---|---|---|---|
| individual devices may have their output controlled, one at a time. Providing high quality information for the system to map and avoid confusion between multiple devices being engaged simultaneously | | | | |
| TEMPERATURE/ INTENSITY CROSS-FADE | Slowly over the course of hours the intensity and hue/temperature of individual or groups of lights may be modulated to map the output intensity to sensor readings with higher fidelity. | Hours | Medium | Medium | Higher fidelity mapping of output intensity to sensor readings |
| HIGH FPS MODULATION | By rapidly modulating the light intensity by a small amplitude, faster than the human eye can detect, mapping formation pervasively | Seconds | Extremely low | Medium | Low fidelity correspondence between sensors and lights |

With the premise and operation of the embodiments described above, we next describe in further detail the development of the mapping (over time) between continuous output devices and smart devices with sensors. We define the "mapping" H as a normalised similarity metric between a sensor equipped smart device and all the continuous output devices in the system. For a sensor-equipped smart device D{i} and smart output device L{j}, we can define a continuous similarity metric G as:

$0 <= G(D\{i\}, L\{j\}) <= 1$, where H is the set of all G for all D{i} and L{j} in the system: $H=\{G(D\{i\}, L\{j\})\}$ for all i, j.

With this established, it can be seen that selecting a discrete zone in the vicinity of D{i} could be achieved with a binary threshold d between 0 and 1:

Z=all j, such that $G(D\{i\}, L\{j\}) > d$.

Having established a continuous similarity metric G allows the concept of zones to become fluid, and we need not restrict ourselves to discrete zones for the purpose of expressing attention. Therefore, different values of d could be selected based on the degree of attentiveness or expression desired by the virtual assistant during an interaction.

Referring again to FIG. 8, the known light activations 810, 805A, 805B, 805C for four smart lighting devices L{i} (710, 705A, 705B, 705C) for j=1 . . . 4 may be represented as I{i}[t]. In this example, the light reading traces 812, 814, 807 from the light sensors on the other smart devices D{i} (712, 714, 707) for i=1 . . . 3 may be represented as S{i}[t].

G(D{i}, L{j}) may be computed from the discretely sampled time series I[t] and S[t], the output device parameters communicated over a network, and the sensor readings respectively. I and S may be sampled at regular intervals close together enough such that they may be meaningfully compared. Many similarity metrics often assume zero-mean signals. However, constant ambient offsets are often present in environmental sensors (e.g. ambient lighting conditions).

Therefore, it is also possible to derive signals I[t]' and S[t]' from I[t] and S[t], and the computation of G from these derived signals. For instance, the smoothed sample-to-sample delta may be expressed as follows:

$$I[t]'=(1-a)*I[t-1]'+a*(I[t]-I[t-1]); \text{ for } 0<a<1$$

Establishing similarity between these two time series for a recent time period T can be achieved through many methods that will be familiar to those skilled in the art of signal processing and statistics, for example, by:

1. Pearson correlation coefficient (PCC or "r") between I[t] and S[t], setting G=(1+PCC)/2, e.g., as described at mathworld.wolfram.com, which is hereby incorporated by reference;

2. The method of 1, but with the time-delta derived versions of I and S;

3. The method of 1, but with mean removed versions of I and S; and/or

4. Dynamic time warping on both I and S, e.g., as described at en.wikipedia.org (which is hereby incorporated by reference), using the produced distance metric as G.

Some implementations may involve automatically updating an automated process of determining whether a device is in a device group, whether a device is in a zone and/or whether a person is in a zone. Some such implementations may involve updating the automated process according to implicit feedback based on one or more of a success of beamforming based on an estimated zone, a success of microphone selection based on the estimated zone, a determination that the person has terminated the response of a voice assistant abnormally, a command recognizer returning a low-confidence result or a second-pass retrospective wakeword detector returning low confidence that a wakeword was spoken.

The goal of predicting the user zone in which the user is located may be to inform a microphone selection or adaptive beamforming scheme that attempts to pick up sound from the acoustic zone of the user more effectively, for example, in order to better recognize a command that follows the wakeword. In such scenarios, implicit techniques for obtaining feedback on the quality of zone prediction may include:

Penalizing predictions that result in misrecognition of the command following the wakeword. A proxy that may indicate misrecognition may include the user cutting short the voice assistant's response to a command, for example, by utterance a counter-command like, for example, "Amanda, stop!";

Penalizing predictions that result in low confidence that a speech recognizer has successfully recognized a command Many automatic speech recognition systems have the capability to return a confidence level with their result that can be used for this purpose;

Penalizing predictions that result in failure of a second-pass wakeword detector to retrospectively detect the wakeword with high confidence; and/or Reinforcing predictions that result in highly confident recognition of the wakeword and/or correct recognition of the user's command.

Following is an example of a failure of a second-pass wakeword detector to retrospectively detect the wakeword with high confidence. Suppose that after obtaining output signals corresponding to a current utterance from microphones in an environment and after determining acoustic features based on the output signals (e.g., via a plurality of first pass wakeword detectors configured for communication with the microphones), the acoustic features are provided to a classifier. In other words, the acoustic features are presumed to correspond to a detected wakeword utterance. Suppose further that the classifier determines that the person who made the current utterance is most likely to be in zone 3, which corresponds to a reading chair in this example. There may, for example, be a particular microphone or learned combination of microphones that is known to be best for listening to the person's voice when the person is in zone 3, e.g., to send to a cloud-based virtual assistant service for voice command recognition.

Suppose further that after determining which microphone(s) will be used for speech recognition, but before the person's speech is actually sent to the virtual assistant service, a second-pass wakeword detector operates on microphone signals corresponding to speech detected by the chosen microphone(s) for zone 3 that you are about to submit for command recognition. If that second pass wakeword detector disagrees with your plurality of first pass wakeword detectors that the wakeword was actually uttered it is probably because the classifier incorrectly predicted the zone. Therefore, the classifier should be penalized.

Techniques for the a posteriori updating of the zone mapping model after one or more wakewords have been spoken may include:

Maximum a posteriori (MAP) adaptation of a Gaussian Mixture Model (GMM) or nearest neighbor model; and/or Reinforcement learning, for example of a neural network, for example by associating an appropriate "one-hot" (in the case of correct prediction) or "one-cold" (in the case of incorrect prediction) ground truth label with the SoftMax output and applying online back propagation to determine new network weights.

Some examples of a MAP adaptation in this context may involve adjusting the means in the GMM each time a wakeword is spoken. In this manner, the means may become more like the acoustic features that are observed when subsequent wakewords are spoken. Alternatively, or additionally, such examples may involve adjusting the variance/covariance or mixture weight information in the GMM each time a wakeword is spoken.

For example, a MAP adaptation scheme may be as follows:

$$\mu_{i,new} = \mu i_{i,old} * \alpha + x * (1-\alpha)$$

In the foregoing equation, $\mu_{i,old}$ represents the mean of the $i^{th}$ Gaussian in the mixture, a represents a parameter which controls how aggressively MAP adaptation should occur (a may be in the range [0.9, 0.999]) and x represents the feature vector of the new wakeword utterance. The index "i" would correspond to the mixture element that returns the highest a priori probability of containing the speaker's location at wakeword time.

Alternatively, each of the mixture elements may be adjusted according to their a priori probability of containing the wakeword, e.g., as follows:

$$M_{i,new} = \mu_{i,old} * \beta_i * x (1-\beta_i)$$

In the foregoing equation, $\beta_i = \alpha * (1-P(i))$, wherein P(i) represents the a priori probability that the observation x is due to mixture element i.

In one reinforcement learning example, there may be three user zones. Suppose that for a particular wakeword, the model predicts the probabilities as being [0.2, 0.1, 0.7] for the three user zones. If a second source of information (for example, a second-pass wakeword detector) confirms that the third zone was correct, then the ground truth label could be [0, 0, 1] ("one hot"). The a posteriori updating of the zone mapping model may involve back-propagating the error through a neural network, effectively meaning that the neural network will more strongly predict zone 3 if shown the same input again. Conversely, if the second source of information shows that zone 3 was an incorrect prediction, the ground truth label could be [0.5, 0.5, 0.0] in one example. Back-propagating the error through the neural network would make the model less likely to predict zone 3 if shown the same input in the future.

Alternatively, or additionally, some implementations may involve automatically updating the automated process according to explicit feedback from a person. Explicit techniques for obtaining feedback may include:

Asking the user whether the prediction was correct using a voice user interface (UI). For example, a sound indicative of the following may be provided to the user: "I think you are on the couch, please say 'right' or 'wrong'").

Informing the user that incorrect predictions may be corrected at any time using the voice UI. (e.g., sound indicative of the following may be provided to the user: "I am now able to predict where you are when you speak to me. If I predict wrongly, just say something like 'Amanda, I'm not on the couch. I'm in the reading chair'").

Informing the user that correct predictions may be rewarded at any time using the voice UI. (e.g., sound indicative of the following may be provided to the user: "I am now able to predict where you are when you speak to me. If I predict correctly you can help to further improve my predictions by saying something like 'Amanda, that's right. I am on the couch.'").

Including physical buttons or other UI elements that a user can operate in order to give feedback (e.g., a thumbs up and/or thumbs down button on a physical device or in a smartphone app).

While specific embodiments and applications of the disclosure have been described herein, it will be apparent to those of ordinary skill in the art that many variations on the embodiments and applications described herein are possible without departing from the scope of this disclosure.

The invention claimed is:

1. A method of controlling a system of devices in an environment, the method comprising:

receiving output signals from each microphone of a plurality of microphones in the environment, each microphone of the plurality of microphones residing in a microphone location of the environment, the output signals corresponding to an utterance of a person;

determining, based at least in part on the output signals, a zone within the environment that has at least a threshold probability of including a location of the person;

generating a plurality of spatially-varying attentiveness signals within the zone, each attentiveness signal of the plurality of attentiveness signals being generated by a device located within the zone, each attentiveness signal indicating that a corresponding device is in an operating mode in which the corresponding device is awaiting a command, wherein each attentiveness signal is spatially varied based on a relevance metric of the corresponding device, and wherein the relevance metric is based, at least in part, on an estimated distance from the location of the person to an acoustic centroid of a plurality of microphones within the zone, wherein the acoustic centroid is computed as a function of zone classification posteriors corresponding to a set of utterances by the person and an estimated position of the person during each utterance in the set.

2. The method of claim 1, wherein an attentiveness signal generated by a first device indicates a relevance metric of a second device, the second device being the corresponding device.

3. The method of claim 1, wherein the relevance metric is based, at least in part, on an estimated visibility of the corresponding device.

4. The method of claim 1, wherein the utterance comprises a wakeword.

5. The method of claim 1, wherein at least one of the plurality of spatially-varying attentiveness signals comprises a modulation of at least one previous signal generated by the device located within the zone prior to a time of the utterance.

6. The method of claim 5, wherein the at least one previous signal comprises a light signal and wherein the modulation comprises at least one of a color modulation, a color saturation modulation or a light intensity modulation.

7. The method of claim 1, wherein at least one microphone of the plurality of microphones is included in or configured for communication with a smart audio device.

8. The method of claim 1, further comprising an automated process of determining whether the device is in a device group.

9. The method of claim 8, wherein the automated process is based, at least in part, on sensor data corresponding to at least one of light or sound emitted by the device, or, wherein the automated process is based, at least in part, on communications between at least one of a source and an orchestrating hub device or a receiver and the orchestrating hub device, or, wherein the automated process is based, at least in part, on a light source or a sound source being switched on and off for a duration of time.

10. The method of claim 8, further comprising automatically updating the automated process according to implicit feedback based on one or more of a success of beamforming based on an estimated zone, a success of microphone selection based on the estimated zone, a determination that the person has terminated a response of a voice assistant abnormally, a command recognizer returning a low-confidence result or a second-pass retrospective wakeword detector returning low confidence that a wakeword was spoken.

11. The method of claim 1, further comprising selecting at least one speaker of the device located within the zone and controlling the at least one speaker to provide sound to the person.

12. The method of claim 1, further comprising selecting at least one microphone of the device located within the zone and providing signals output by the at least one microphone to a smart audio device.

13. The method of claim 1, wherein a first microphone of the plurality of microphones samples audio data according to a first sample clock and a second microphone of the plurality of microphones samples the audio data according to a second sample clock.

14. An apparatus configured to perform the method of claim 1.

15. A system of devices configured to perform the method of claim 1.

16. One or more non-transitory media having software stored thereon, the software including instructions for controlling one or more devices to perform the method of claim 1.

* * * * *